United States Patent
Hirakawa et al.

(10) Patent No.: US 10,843,759 B2
(45) Date of Patent: Nov. 24, 2020

(54) VEHICLE

(71) Applicant: YAMAHA HATSUDOKI KABUSHIKI KAISHA, Iwata (JP)

(72) Inventors: Nobuhiko Hirakawa, Shizuoka (JP); Ryuta Mitsuoka, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 99 days.

(21) Appl. No.: 16/169,309

(22) Filed: Oct. 24, 2018

(65) Prior Publication Data

US 2019/0118894 A1 Apr. 25, 2019

(30) Foreign Application Priority Data

Oct. 25, 2017 (JP) .................. 2017-206642
Aug. 2, 2018 (JP) .................. 2018-146026

(51) Int. Cl.
| | |
|---|---|
| *B62K 5/10* | (2013.01) |
| *B62K 5/08* | (2006.01) |
| *B62J 17/00* | (2020.01) |
| *B62K 5/06* | (2006.01) |
| *B62K 5/027* | (2013.01) |
| *B62K 25/08* | (2006.01) |
| *B62K 21/12* | (2006.01) |

(Continued)

(52) U.S. Cl.
CPC ............ *B62K 5/10* (2013.01); *B62J 17/00* (2013.01); *B62J 23/00* (2013.01); *B62K 5/027* (2013.01); *B62K 5/05* (2013.01); *B62K 5/06* (2013.01); *B62K 5/08* (2013.01); *B62K 11/04* (2013.01); *B62K 21/12* (2013.01); *B62K 25/08* (2013.01); *B62K 2005/001* (2013.01)

(58) Field of Classification Search
CPC . B62K 5/10; B62K 5/05; B62K 11/04; B62K 21/12; B62K 25/08; B62K 5/027; B62K 5/06; B62K 5/08; B62K 2005/001; B62J 23/00; B62J 17/00
See application file for complete search history.

(56) References Cited

U.S. PATENT DOCUMENTS 4,066,291 A * 1/1978 Hickman ............... B60S 1/0438
 135/115
4,351,410 A * 9/1982 Townsend ................ B62D 9/02
 180/210

(Continued)

FOREIGN PATENT DOCUMENTS

EP 3 153 389 A1 4/2017
EP 3 156 312 A1 4/2017

(Continued)

OTHER PUBLICATIONS

Official Communication issued in European Patent Application No. 18202492.7, dated Mar. 21, 2019.

*Primary Examiner* — Timothy Wilhelm
(74) *Attorney, Agent, or Firm* — Keating and Bennett, LLP

(57) ABSTRACT

A waterproof cover is attached to a portion of a body frame positioned behind a rear end of a left side member and ahead of left and right engine supports of the body frame when looking at a vehicle standing in an upright state from the left of the vehicle, and at least a portion of the waterproof cover overlaps at least one of a right side member and the left side member when looking at the vehicle from the front of the vehicle.

5 Claims, 9 Drawing Sheets

(51) Int. Cl.
*B62K 11/04* (2006.01)
*B62K 5/05* (2013.01)
*B62J 23/00* (2006.01)
*B62K 5/00* (2013.01)

(56) References Cited

U.S. PATENT DOCUMENTS

| | | | | |
|---|---|---|---|---|
| 4,473,251 A * | 9/1984 | Murayama | | B60R 11/02 296/78.1 |
| 4,787,470 A * | 11/1988 | Badsey | | B62D 61/065 180/210 |
| 5,116,069 A * | 5/1992 | Miller | | B60G 3/14 180/210 |
| 5,458,390 A * | 10/1995 | Gilbert | | B62J 17/00 296/78.1 |
| 6,435,522 B1 * | 8/2002 | Van Den Brink | | B62D 9/02 280/5.509 |
| 6,817,617 B2 * | 11/2004 | Hayashi | | B62K 5/05 280/124.1 |
| 7,073,806 B2 * | 7/2006 | Bagnoli | | B62K 5/05 180/210 |
| 7,131,650 B2 * | 11/2006 | Melcher | | B60G 7/006 280/5.52 |
| 7,556,115 B2 * | 7/2009 | Iwanaga | | B62J 99/00 180/219 |
| 7,600,596 B2 * | 10/2009 | Van Den Brink | | B62J 25/00 180/210 |
| 7,802,800 B2 * | 9/2010 | Melcher | | B60G 17/0162 180/282 |
| 7,931,286 B2 * | 4/2011 | Melcher | | B60G 7/006 280/124.103 |
| 8,020,878 B2 * | 9/2011 | Hara | | B60G 21/05 280/5.509 |
| 8,070,172 B1 * | 12/2011 | Smith | | B60G 11/08 280/124.103 |
| 8,991,543 B2 * | 3/2015 | Nagakubo | | B62K 19/38 180/219 |
| 9,227,662 B2 * | 1/2016 | Bartolozzi | | B62K 5/027 |
| 9,296,420 B2 * | 3/2016 | Sasaki | | B62J 15/00 |
| 9,370,996 B2 * | 6/2016 | Kawata | | B60K 13/02 |
| 9,739,245 B2 * | 8/2017 | Yamashita | | F02M 35/1255 |
| 9,771,118 B2 * | 9/2017 | Takano | | B60G 13/003 |
| 9,821,874 B2 * | 11/2017 | Takano | | B62K 5/05 |
| 9,840,299 B2 * | 12/2017 | Takano | | B62J 35/00 |
| 9,868,486 B2 * | 1/2018 | Hagimoto | | B60K 11/04 |
| 10,023,260 B2 * | 7/2018 | Mori | | B62K 21/02 |
| 10,077,092 B2 * | 9/2018 | Ozeki | | B62K 11/04 |
| 10,131,394 B2 * | 11/2018 | Sasaki | | B62J 15/00 |
| 10,173,743 B2 * | 1/2019 | Mori | | B62K 21/02 |
| 10,286,970 B2 * | 5/2019 | Ohno | | B62K 5/027 |
| D850,981 S * | 6/2019 | Kinoshita | | D12/107 |
| 10,479,434 B2 * | 11/2019 | Yamamoto | | B62M 7/02 |
| 10,549,806 B2 * | 2/2020 | Matsuo | | B62K 19/16 |
| 2006/0219201 A1 * | 10/2006 | Seki | | F02M 35/162 123/184.55 |
| 2009/0312908 A1 * | 12/2009 | Van Den Brink | | B62D 9/02 701/38 |
| 2010/0032914 A1 * | 2/2010 | Hara | | B60G 13/08 280/5.509 |
| 2010/0147615 A1 * | 6/2010 | Tsujii | | B60G 3/145 180/215 |
| 2011/0060494 A1 * | 3/2011 | Tsujii | | B60G 21/106 701/31.4 |
| 2013/0168944 A1 * | 7/2013 | Bartolozzi | | B62K 11/02 280/269 |
| 2014/0204598 A1 * | 7/2014 | Di Tanna | | B60Q 1/12 362/460 |
| 2015/0122567 A1 * | 5/2015 | Marois | | B60K 11/04 180/210 |
| 2015/0232147 A1 * | 8/2015 | Hirayama | | B62K 21/20 280/267 |
| 2015/0259027 A1 * | 9/2015 | Takano | | B62K 25/08 280/267 |
| 2015/0298736 A1 * | 10/2015 | Sasaki | | B62J 15/00 280/124.103 |
| 2016/0056482 A1 * | 2/2016 | Otsuka | | B60L 50/72 180/220 |
| 2016/0152293 A1 * | 6/2016 | Hirayama | | B62K 5/05 280/124.103 |
| 2016/0185413 A1 * | 6/2016 | Takano | | B62K 5/027 280/124.103 |
| 2016/0229480 A1 * | 8/2016 | Mori | | B62D 9/02 |
| 2016/0280193 A1 * | 9/2016 | Seto | | B60T 8/1706 |
| 2017/0050694 A1 * | 2/2017 | Pestritto | | B62K 21/12 |
| 2017/0057594 A1 * | 3/2017 | Watanabe | | B62K 25/04 |
| 2017/0088232 A1 * | 3/2017 | Kaneta | | B62L 1/005 |
| 2017/0203807 A1 | 7/2017 | Hirakawa et al. | | |
| 2017/0282991 A1 * | 10/2017 | Mizuta | | B62J 6/04 |
| 2017/0349233 A1 * | 12/2017 | Mizutani | | B62H 1/04 |
| 2018/0037291 A1 * | 2/2018 | Shimizu | | B62K 11/04 |
| 2018/0072364 A1 * | 3/2018 | Matsuo | | B62D 29/04 |
| 2018/0072368 A1 * | 3/2018 | Matsuo | | B62K 11/02 |
| 2018/0086168 A1 * | 3/2018 | Iguchi | | B60G 17/0162 |
| 2018/0086406 A1 * | 3/2018 | Janyapanich | | B62J 17/00 |
| 2018/0086408 A1 * | 3/2018 | Yamamoto | | B60L 50/71 |
| 2018/0093729 A1 * | 4/2018 | Srivirat | | B62J 6/02 |
| 2018/0093731 A1 * | 4/2018 | Nakayama | | B62K 11/04 |
| 2018/0148118 A1 * | 5/2018 | Horiguchi | | B62K 5/02 |
| 2018/0290684 A1 * | 10/2018 | Suda | | B60W 30/04 |
| 2019/0085808 A1 * | 3/2019 | Nelson | | B62K 11/04 |
| 2019/0382068 A1 * | 12/2019 | Nagasaka | | B62K 5/027 |

FOREIGN PATENT DOCUMENTS

EP  3 162 682 A2  5/2017
JP  5941601 B1  6/2016

* cited by examiner

VEHICLE

CROSS REFERENCE TO RELATED APPLICATIONS

This application claims the benefit of priority to Japanese Patent Application No. 2017-206642 filed on Oct. 25, 2017 and Japanese Patent Application No. 2018-146026 filed on Aug. 2, 2018. The entire contents of each application are hereby incorporated herein by reference.

BACKGROUND OF THE INVENTION

1. Field of the Invention

The present invention relates to a vehicle including a body frame that is able to lean and two front wheels that are aligned side by side in a left-and-right direction.

2. Description of the Related Art

Japanese Patent No. JP-B-5941601 describes a vehicle including a body frame that can lean and a right front wheel and a left front wheel that are aligned side by side in a left and right direction.

This vehicle leans to the right of the vehicle when the vehicle turns to the right and leans to the left of the vehicle when the vehicle turns to the left. The vehicle includes a link mechanism that supports the right front wheel and the left front wheel at a front portion of the body frame. An engine is fixed to an engine supporting portion directly behind the link mechanism so as not to be displaced on the body frame of the vehicle.

SUMMARY OF THE INVENTION

The inventor of preferred embodiments of the present invention has discovered that rust is likely to be caused at a portion of the body frame of the vehicle described in JP-B-5941601.

Preferred embodiments of the present invention provide vehicles in which the occurrence of rust is significantly reduced or prevented.

According to a preferred embodiment of the present invention, a vehicle includes a body frame that leans right when the vehicle turns right and leans left when the vehicle turns left; a right front wheel that rotates about a right axle extending in a direction of a right axle axis; a left front wheel provided leftward of the right front wheel and that rotates about a left axle extending in a direction of a left axle axis; a linkage that changes a relative position of the right front wheel and the left front wheel in an up-and-down direction of the body frame as the body frame leans; a right shock absorber that supports the right front wheel at a lower portion thereof and absorbs a relative displacement of the lower portion to an upper portion thereof along a right extension and contraction axis extending in the up-and-down direction of the body frame; a left shock absorber that supports the left front wheel at a lower portion thereof and absorbs a relative displacement of the lower portion to an upper portion thereof along a left extension and contraction axis extending in the up-and-down direction of the body frame; an engine fixed to an engine support of the body frame so as not to be displaced; and a body cover that covers at least a portion of the linkage; wherein the linkage includes a right side member that supports the upper portion of the right shock absorber such that the upper portion is able to turn about a right steering axis; a left side member that supports the upper portion of the left shock absorber such that the upper portion is able to turn about a left steering axis; an upper cross member that supports an upper portion of the right side member at a right end portion of the upper cross member such that the upper portion is able to turn about a right upper axis extending in a front-and-rear direction of the body frame, supports an upper portion of the left side member at a left end portion of the upper cross member such that the upper portion is able to turn about a left upper axis extending parallel to the right upper axis, and is supported on the body frame at a middle portion of the upper cross member so as to turn about a middle upper axis extending parallel to the right upper axis and the left upper axis; and a lower cross member that supports a lower portion of the right side member at a right end portion of the lower cross member such that the lower portion is able to turn about a right lower axis extending parallel to the right upper axis, supports a lower portion of the left side member at a left end portion of the lower cross member such that the lower portion is able to turn about a left lower axis extending parallel to the left upper axis, and is supported on the body frame at a middle portion of the lower cross member so as to turn about a middle lower axis extending parallel to the middle upper axis; and the vehicle satisfies at least one of a condition (A) and a condition (B): the condition (A) in which a right waterproof cover is located behind a rear end of the right side member and ahead of the engine support of the body frame when the vehicle standing in an upright state is seen from the right of the vehicle, and at least a portion of the right waterproof cover overlaps the right side member when the vehicle is seen from the front of the vehicle; and the condition (B) in which a left waterproof cover is located behind a rear end of the left side member and ahead of the engine support of the body frame when the vehicle standing in an upright state is seen from the left of the vehicle, and at least a portion of the left waterproof cover overlaps the left side member when the vehicle is seen from the front of the vehicle.

According to a preferred embodiment of the present invention, the vehicle includes a rigid engine fixed so as not to be displaced relative to the engine support located directly behind the linkage on the body frame. In relation to vehicles having such a rigid engine, the inventor discovered the likelihood of rust occurring at a portion of a body frame described below.

In a vehicle including a rigid engine, the body frame is heated by heat generated by the engine. The inventor discovered the possibility of rust being caused by the heated body frame.

The inventor discovered that rust tends to be caused at a location that satisfies three conditions: the location is exposed to a certain temperature; the location is splashed with water; and the location is not dried quickly.

It is preferable that the engine is supported over a wide span. On the other hand, it is preferable that the vehicle is not expanded in the widthwise direction. Additionally, the engine should be positively cooled. Thus, the periphery of the engine support is not covered with a cover on many occasions. Due to this, a body frame portion of the body frame that is located on the periphery of the engine to support the engine is not covered so as to be exposed to outside air. In addition, heat is conducted sufficiently to the body frame portion, and hence, the body frame portion is dried easily. Due to this, this body frame portion tends to be subjected to a flow of outside air and be dried easily, and hence, the body frame portion does not rust easily.

On the other hand, the heat of the engine is not easily conducted to a body frame portion located on the periphery of the linkage disposed far away from the engine, and hence, this body frame portion does not rust easily.

The inventor discovered that a middle body frame portion located in the middle of the body frame between the engine and the linkage tends to rust easily when compared with the two body frame portions described above. The reason that the middle body frame portion tends to rust easily is as follows.

The middle body frame portion extends from a portion that supports the linkage towards the engine support and is inevitably positioned directly behind the linkage on the body frame.

Water splashed up by the right front wheel adheres to the right side member, and water spreading from this right side member adheres to the middle body frame portion. Alternatively, water splashed up by the right front wheel flies directly to the middle body frame portion and adheres to it. Similarly, water splashed up by the left front wheel adheres to the left side member, and water spreading from the left side member adheres to the middle body frame portion. Alternatively, water splashed up by the left front wheel flies directly to the middle body frame portion and adheres to it. Muddy water splashed up by tires tends to cause the body frame to rust more.

Further, the middle frame portion is warmed to a certain temperature. When the vehicle is running, air flows easily to a space directly behind the linkage, but when the vehicle is at a stop, the flow of air is interrupted by the linkage, and hence, fresh air does not reach easily the space directly behind the linkage, such that the air becomes stagnant in the space. When the vehicle is running, the water adhering to the linkage is forced to fly therefrom and adheres to the middle body frame portion. The air in the space at the middle body frame portion stagnates when the vehicle is at a stop, and this produces a difficult condition where the above-described space is not dried over a long period of time. Due to this, this middle body frame portion satisfies the three rust causing conditions: the middle body frame portion is warmed to a certain temperature, water adheres to the middle body frame portion, and the middle body frame portion is left undried over a long period of time. The inventor has discovered from these situations that a rust preventive measure should be taken particularly on the middle body frame portion.

According to a preferred embodiment of the present invention, the waterproof cover is mounted on the middle body frame portion of the body frame at a location where the waterproof cover overlaps at least a portion of at least one of the right side member and the left side member when the vehicle standing in the upright state is seen from the front of the vehicle 1. This prevents the middle body frame portion that tends to rust easily from being splashed with water.

According to a preferred embodiment of the present invention, the engine preferably includes a crankcase and a cylinder block mounted on an upper portion of the crankcase and extending upwards in the up-and-down direction of the body frame, and the body frame may support the engine by the engine support being connected to the cylinder block.

According to a preferred embodiment of the present invention, the body frame preferably includes a link support that supports the upper cross member and the lower cross member; a right frame extending from the link support rearwards in a front-and-rear direction of the body frame; and a left frame extending from the link support rearwards in the front-and-rear direction of the body frame; the engine support is preferably provided on the right frame and the left frame, and the condition (A) preferably includes a condition that the right waterproof cover is located rightward of the right frame in a left-and-right direction of the body frame, and the condition (B) preferably includes a condition that the left waterproof cover is located leftward of the left frame in the left-and-right direction of the body frame.

According to a preferred embodiment of the present invention, the condition (A) preferably includes a condition that the right waterproof cover includes a plane extending parallel to a turning locus of the linkage on a front surface of the right waterproof cover in the front-and-rear direction of the body frame, and the condition (B) preferably includes a condition that the left waterproof cover includes a plane extending parallel to a turning locus of the linkage on a front surface of the left waterproof cover in the front-and-rear direction of the body frame. This enables the waterproof covers to be disposed near the linkage, such that an intrusion of water is efficiently prevented at a more upstream side.

According to a preferred embodiment of the present invention, the vehicle preferably includes a fuel tank disposed directly above the engine, the body cover preferably includes an upper cover that covers the fuel tank, and the condition (A) preferably includes a condition that the right waterproof cover is separate from the upper cover, and the condition (B) preferably includes a condition that the left waterproof cover is separate from the upper cover.

According to preferred embodiments of the present invention, it is possible to provide the vehicles in which the occurrence of rust is significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
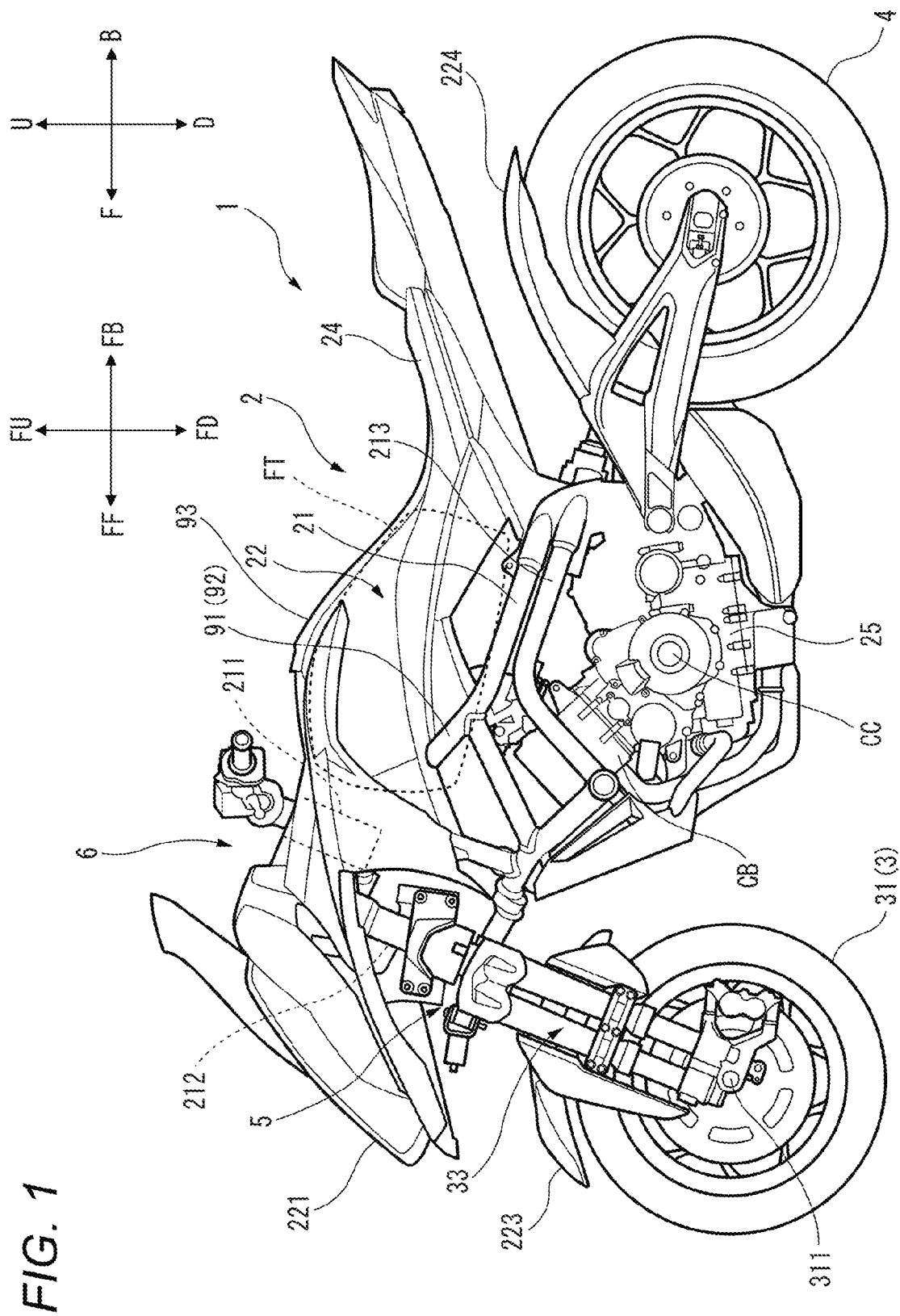
FIG. 1 is a side view showing an entire vehicle according to a preferred embodiment of the present invention as seen from a left side thereof.

Referring to the accompanying drawings, preferred embodiments will be described in detail below.

In the accompanying drawings, an arrow F denotes ahead of a vehicle. An arrow B denotes behind the vehicle. An arrow U denotes above the vehicle. An arrow D denotes below the vehicle. An arrow R denotes on the right of the vehicle. An arrow L denotes on the left of the vehicle.

A vehicle turns with a body frame leaning in a left-and-right direction of the vehicle relative to a vertical direction. Then, in addition to the directions based on the vehicle, directions based on the vehicle body frame are defined. In the accompanying drawings, an arrow FF denotes ahead of the vehicle body frame. An arrow FB denotes behind the vehicle body frame. An arrow FU denotes above the vehicle body frame. An arrow FD denotes below the vehicle body frame. An arrow FR denotes on the right of the vehicle body frame. An arrow FL denotes on the left of the vehicle body frame.

In this description, a "front-and-rear direction of the body frame," a "left-and-right direction of the body frame," and an "up-and-down direction of the body frame" refers to a front-and-rear direction, a left-and-right direction and an up-and-down direction based on the body frame as viewed from a rider who rides the vehicle. "The side of the body frame" denotes on the right or on the left of the body frame.

When referred to in this description, an expression reading "something extends in the front-and-rear direction of the vehicle body frame" includes a situation in which something extends in the front-and-rear direction of the vehicle body frame while being inclined in relation to the front-and-rear direction of the vehicle body frame and that something extends with a gradient which is closer to the front-and-rear direction of the vehicle body frame rather than the left-and-right direction and the up-and-down direction of the vehicle body frame.

In this description, an expression reading "something extends in the left-and-right direction of the vehicle body frame" includes a situation in which something extends in the left-and-right direction of the vehicle body frame while being inclined in relation to the left-and-right direction of the vehicle body frame and that something extends with a gradient which is closer to the left-and-right direction of the vehicle body frame rather than the front-and-rear direction and the up-and-down direction of the vehicle body frame.

In this description, an expression reading "something extends in the up-and-down direction of the vehicle body frame" includes a situation in which something extends in the up-and-down direction of the vehicle body frame while being inclined in relation to the up-and-down direction of the vehicle body frame and that something extends with a gradient which is closer to the up-and-down direction of the vehicle body frame rather than the front-and-rear direction and the left-and-right direction of the vehicle body frame.

In this description, an "upright state of the vehicle" or the "vehicle stands upright" refers to a state in which the vehicle remains not steered and the up-and-down direction of the body frame coincides with a vertical direction. In this state, the direction based on the vehicle coincides with the direction based on the body frame. When the vehicle is turning with the body frame leaning to the left or right from the vertical direction, the left-and-right direction of the vehicle does not coincide with the left-and-right direction of the body frame. The up-and-down direction of the vehicle does not coincide with the up-and-down direction of the body frame, too. However, the front-and-rear direction of the vehicle coincides with the front-and-rear direction of the body frame.

In this description, "rotation or rotating" refers to a member that is displaced at an angle of 360 degrees or more about a center axis thereof. In this description, "turn or turning" refers to a member that is displaced at an angle of less than 360 degrees about a center axis thereof.

Referring to FIGS. 1 to 7, a vehicle 1 according to preferred embodiments of the present invention will be described. A vehicle 1 is preferably driven by power generated from a power source and including a body frame that is able to lean and two front wheels which are aligned side by side in a left-and-right direction of the body frame.

FIG. 1 is a left side view of the entire vehicle 1 as viewed from the left of the vehicle. The vehicle 1 includes a vehicle main body 2, a pair of left and right front wheels 3, a rear wheel 4, a linkage 5, and a steering force transmission 6.

The vehicle main body 2 includes a body frame 21, a body cover 22, a seat 24, and an engine unit 25. In FIG. 1, the vehicle 1 is in an upright state. The following description which will be provided with reference to FIG. 1 is based on the premise that the vehicle 1 is standing in the upright state.

The body frame 21 extends in a front-and-rear direction of the vehicle 1. The body frame 21 includes a headpipe 211 and a link support 212.

The headpipe 211 supports an upstream side steering shaft 60, which will be described below, so as to turn. The headpipe 211 extends in an up-and-down direction of the body frame 21.

The link support 212 is provided ahead of the headstock 211 in the front-and-rear direction of the vehicle 1. The link support 212 supports the linkage 5 so as to turn.

The body frame 21 supports the engine unit 25 behind the headstock 211 in the front-and-rear direction of the vehicle 1. The engine unit 25 supports the rear wheel 4 so as to swing up and down. The engine unit 25 includes a power source such as an engine or an electric motor with a battery and a device such as a transmission. The power source generates power by which the vehicle 1 is driven.

The body cover 22 includes a front cover 221, a pair of left and right front fenders 223 and a rear fender 224. The body cover 22 is a body element which covers at least a portion of body elements which are mounted on the vehicle 1 such as the pair of left and right front wheels 3, the body frame 21, and the linkage 5. In this preferred embodiment, the body cover 22 covers at least a portion of the linkage.

The front cover 221 is disposed ahead of the seat 24.

The front cover 221 covers the linkage 5 and at least a portion of the steering force transmission 6.

At least portions of the pair of left and right front fenders 223 are individually disposed directly below the front cover 221. At least portions of the pair of left and right front fenders 223 are disposed directly above the pair of left and right front wheels 3, respectively.

At least a portion of the rear fender 224 is disposed directly above the rear wheel 4.

At least portions of the pair of left and right front wheels 3 are disposed directly below the front cover 221.

At least a portion of the rear wheel 4 is disposed below the seat 24. At least a portion of the rear wheel 4 is disposed directly below the rear fender 224.

Figure 2:
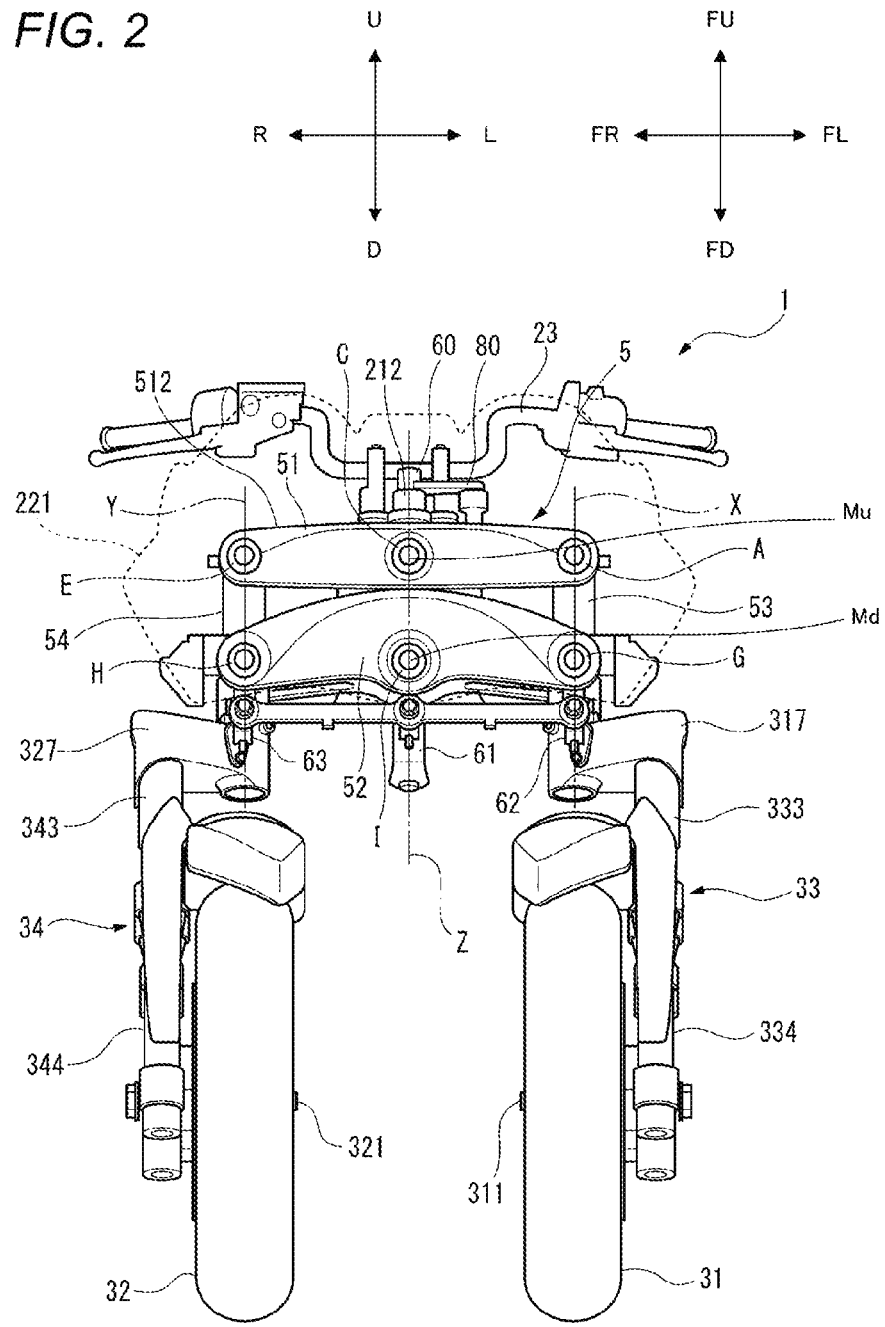
FIG. 2 is a front view showing a front portion of the vehicle shown in FIG. 1.

FIG. 2 is a front view of a front portion of the vehicle 1 as viewed from the front of the body frame 21. In FIG. 2, the vehicle 1 is standing in the upright state. The following description which will be provided with reference to FIG. 2 is based on the premise that the vehicle 1 is standing in the upright state. FIG. 2 shows the front portion of the vehicle 1 as seen through the front cover 221 that is indicated by dashed lines.

The pair of left and right front wheels 3 include a left front wheel 31 and a right front wheel 32. The left front wheel 31 and the right front wheel 32 are provided in the left-and-right direction of the vehicle body frame 21. The right front wheel 32 is provided on the right of the left front wheel 31 on the body frame 21.

The vehicle 1 includes a left shock absorber 33, a right shock absorber 34, a left bracket 317, and a right bracket 327.

Figure 3:
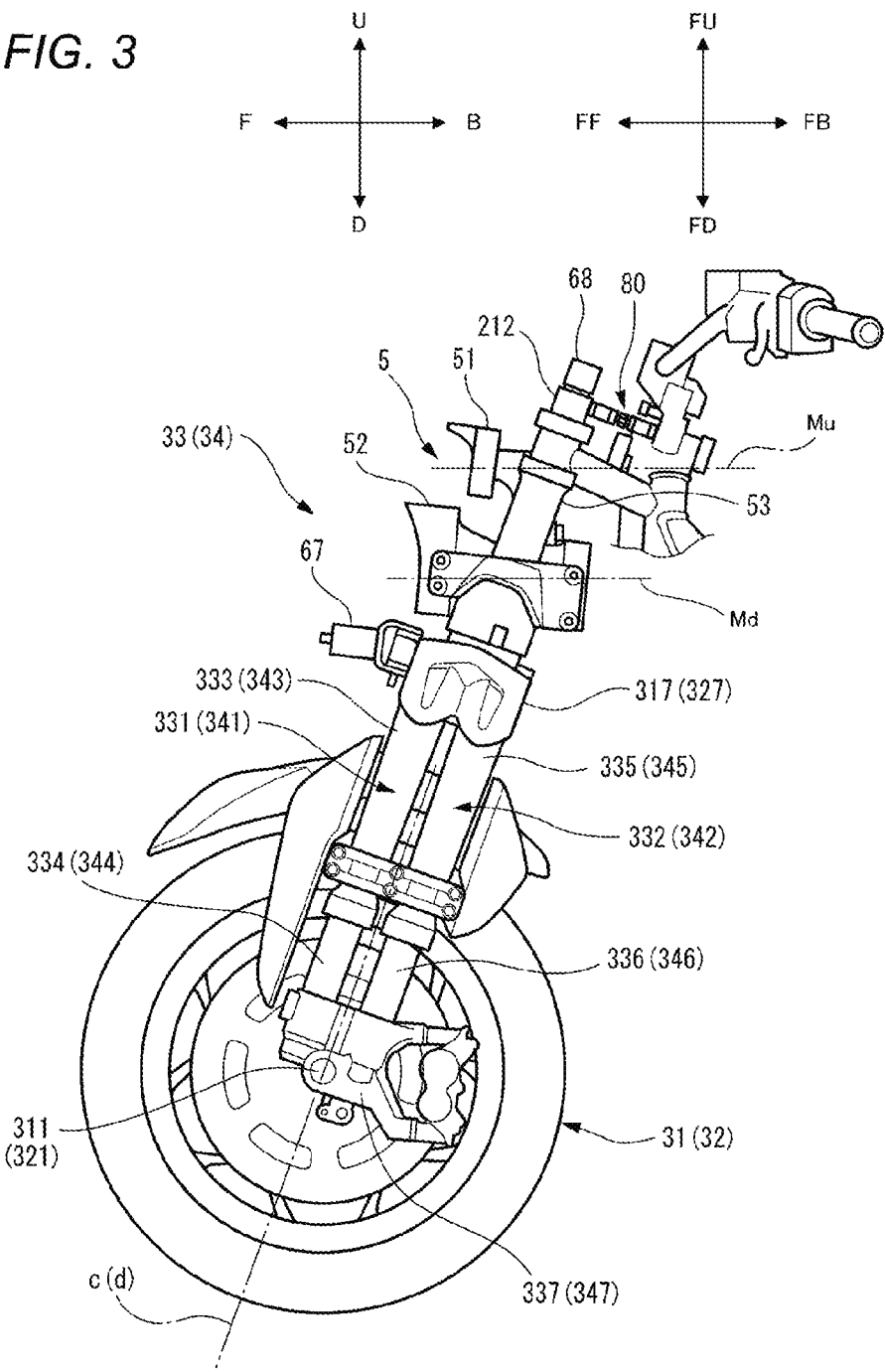
FIG. 3 is a side view showing a left shock absorber and a left front wheel.

FIG. 3 is a side view showing the left shock absorber 33 and the left front wheel 31. Since the right shock absorber 34 preferably has a structure symmetrical with the left shock absorber 33, the reference numbers showing the elements of the right shock absorber 34 are also added in FIG. 3.

As shown in FIG. 3, the left shock absorber 33 is preferably a so-called telescopic shock absorber. The left shock absorber 33 includes a left front telescopic element 331, a left rear telescopic element 332, and a left inner connector 337.

The left front telescopic element 331 includes a left front outer tube 333 and a left front inner tube 334. A lower portion of the left front inner tube 334 is connected to a left inner connector 337. An upper portion of the left front inner tube 334 is inserted into the left front outer tube 333. An upper portion of the left front outer tube 333 is connected to the left bracket 317. The left front inner tube 334 is displaced relative to the left front outer tube 333 along a left extension and contraction axis c which extends in the up-and-down direction of the body frame 21. The left front telescopic element 331 is able to extend and contract in the direction of the left extension and contraction axis c as a result of the left front inner tube 334 being displaced relative to the left front outer tube 333 along the left extension and contraction axis c.

At least a portion of the left rear telescopic element 332 is provided behind the left front telescopic element 331. The left rear telescopic element 332 includes a left rear outer tube 335 and a left rear inner tube 336. The left rear outer tube 335 and the left front outer tube 333 are connected together so as not to move relative to each other.

A lower portion of the left rear inner tube 336 is connected to a left inner connector 337. An upper portion of the left rear inner tube 336 is inserted into the left rear outer tube 335. An upper portion of the left rear outer tube 335 is connected to the left bracket 317.

The left rear inner tube 336 is displaced relative to the left rear outer tube 335 along the left extension and contraction axis c which extends in the up-and-down direction of the body frame 21. The left rear telescopic element 332 is able to extend and contract in the direction of the left extension and contraction axis c as a result of the left rear inner tube 336 being displaced relative to the left rear outer tube 335 along the left extension and contraction axis c.

The left inner connector 337 rotatably supports a left axle 311 of the left front wheel 31. The left inner connector 337 connects a lower portion of the left front inner tube 334 and a lower portion of the left rear inner tube 336 together.

The left shock absorber 33 attenuates or absorbs a displacement of the left front wheel 31 relative to the left front outer tube 333 and the left rear outer tube 335 along the left extension and contraction axis c by an extending or contracting action of the left front telescopic element 331 and an extending or contracting action of the left rear telescopic element 332.

As shown in FIG. 3, the right shock absorber 34 is preferably a so-called telescopic shock absorber. The right shock absorber 34 includes a right front telescopic element 341, a right rear telescopic element 342, and a right inner connector 347.

The right front telescopic element 341 includes a right front outer tube 343 and a right front inner tube 344. A lower portion of the right front inner tube 344 is connected to a right inner connector 347. An upper portion of the right front inner tube 344 is inserted into a right front outer tube 343. An upper portion of the right front outer tube 343 is connected to the right bracket 327. With respect to the right front outer tube 343, the right inner tube 344 displaces along a right extension and contraction axis d which extends in the up-and-down direction of the vehicle body frame 21. The right front telescopic element 341 is able to extend and contract in the direction of the right extension and contraction axis d as a result of the right front inner tube 344 being displaced relative to the right front outer tube 343 along the right extension and contraction axis d.

At least a portion of the right rear telescopic element 342 is provided behind the right front telescopic element 341. The right rear telescopic element 342 includes a right rear outer tube 345 and a right rear inner tube 346. The right rear outer tube 345 and the right front outer tube 343 are connected together so as not to move relative to each other.

A lower portion of the right rear inner tube 346 is connected to a rear inner connector 347. An upper portion of the right rear inner tube 346 is inserted to the right rear outer tube 345. An upper portion of the right rear outer tube 345 is connected to the right bracket 327.

With respect to the right rear outer tube 345, the right rear inner tube 346 is displaced along the right extension and contraction axis d which extends in the up-and-down direction of the vehicle body frame 21. The right rear telescopic element 342 is able to extend and contract in the direction of the right extension and contraction axis d as a result of the right rear inner tube 346 being displaced relative to the right rear outer tube 345 along the right extension and contraction axis d.

The right inner connector 347 rotatably supports a right axle 321 of the right front wheel 32. The right inner connector 347 connects a lower portion of the right front inner tube 344 and a lower portion of the right rear inner tube 346 together.

The right shock absorber 34 attenuates or absorbs the displacement of the right front wheel 32 relative to the right front outer tube 343 and the right rear outer tube 345 along the right extension and contraction axis d by an extending or contracting action of the right front telescopic element 341 and an extending or contracting action of the right rear telescopic element 342.

Figure 4:
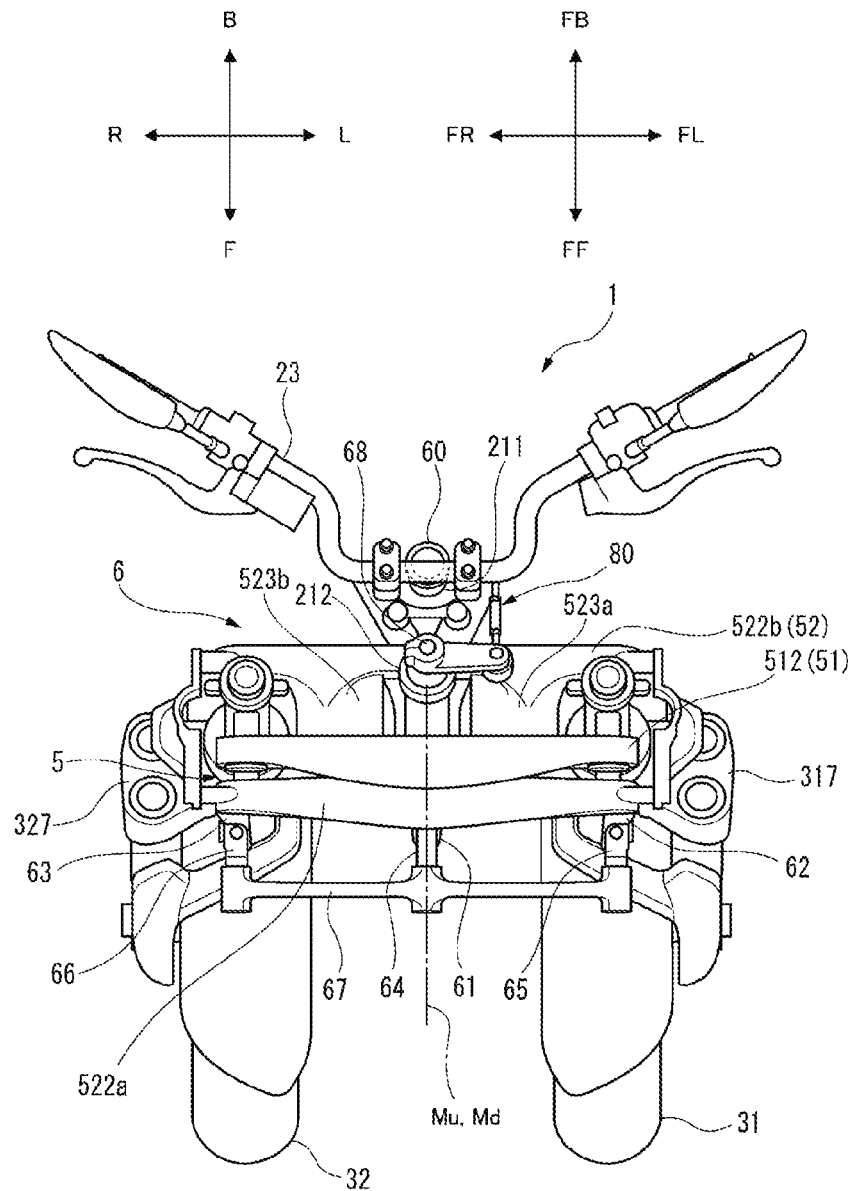
FIG. 4 is a plan view showing the front portion of the vehicle shown in FIG. 1.

As shown in FIG. 4, the vehicle 1 includes the steering force transmission 6. The steering force transmission 6 includes a handlebar 23 (an example of a steering force input), the upstream side steering shaft 60 (an example of a rear shaft member), a connecting member 80, and a downstream side steering shaft 68 (an example of a front shaft member).

The body frame 21 includes the headpipe 211 that supports the upstream side steering shaft 60 so as to turn and the link support 212 that supports the downstream side steering shaft 68 so as to turn. As shown in FIG. 2, the link support 212 extends in the direction of a middle steering axis Z which extends in the up-and-down direction of the body frame 21. In this preferred embodiment, a turning center (a central steering axis) of the handlebar 23 coincides with a turning center (a rear axis) of the upstream side steering shaft.

A steering force is inputted into the handlebar 23. The upstream side steering shaft 60 is connected to the handlebar 23. The upper portion of the upstream side steering shaft 60 is located behind the lower portion of the upstream side steering shaft 60 in the front-and-rear direction of the vehicle body frame 21. The upstream side steering shaft 60 is supported in the headpipe 211 so as to turn therein.

The connecting member 80 connects the upstream side steering shaft 60 and the downstream side steering shaft 68 together. The connecting member 80 is displaced as the upstream side steering shaft 60 turns. The connecting member 80 transmits the turning motion of the upstream side steering shaft 60 to the downstream side steering shaft 68.

The downstream side steering shaft 68 is supported in the link support 212 so as to turn therein. The downstream side steering shaft 68 is connected to the connecting member 80. The downstream side steering shaft 68 is provided ahead of the upstream side steering shaft 60 in the front-and-rear direction of the body frame 21. The downstream side steering shaft 68 turns in accordance with the displacement of the connecting member 80. As a result of the downstream side steering shaft 68 turning, the left front wheel 31 and the right front wheel 32 are steered or turned via a tie-rod 67.

The steering force transmission 6 transmits a steering force exerted on a handlebar 23 by the rider when operating the handlebar 23 to the left bracket 317 and the right bracket 327. A specific structure will be described in detail below.

In the vehicle 1 according to this preferred embodiment, the linkage 5 preferably uses a four parallel joint link system (also referred to as a parallelogram link).

As shown in FIG. 2, the linkage 5 is disposed above the left front wheel 31 and the right front wheel 32. The linkage 5 includes an upper cross member 51, a lower cross member 52, a left side member 53, and a right side member 54. The linkage 5 is turnably supported on the link support 212 which extends to the middle steering axis Z. Even though the upstream side steering shaft 60 is turned as a result of the operation of the handlebar 23, the linkage 5 is prevented from following the turning motion of the upstream side steering shaft 60 and hence does not turn.

The upper cross member 51 includes a plate member 512. The plate member 512 is provided ahead of the link support 212. The plate member 512 extends in a left-and-right direction of the body frame 21.

A middle portion of the upper cross member 51 is connected to the link support 212 by a connecting portion C. The upper cross member 51 is able to turn relative to the link support 212 about a middle upper axis Mu that passes through the connecting portion C to extend in the front-and-rear direction of the body frame 21.

A left end portion of the upper cross member 51 is connected to the left side member 53 by a connecting portion A. The upper cross member 51 is able to turn relative to the left side member 53 about a left upper axis which passes through the connecting portion A to extend in the front-and-rear direction of the body frame 21.

A right end portion of the upper cross member 51 is connected to the right side member 54 by a connecting portion E. The upper cross member 51 is able to turn relative to the right side member 54 about a right upper axis that passes through the connecting portion E to extend in the front-and-rear direction of the body frame 21.

FIG. 4 is a plan view of the front portion of the vehicle 1 as seen from above the body frame 21. In FIG. 4, the vehicle 1 is standing in the upright state. The following description which will be provided with reference to FIG. 4 is based on the premise that the vehicle 1 is standing in the upright state.

As shown in FIG. 4, the lower cross member 52 includes a lower front cross element 522a and a lower rear cross element 522b. The lower front cross element 522a is provided ahead of the link support 212. The lower rear cross element 522b is provided behind the link support 212. The lower front cross element 522a and the lower rear cross member 522b extend in the left-and-right direction of the body frame 21. The lower front cross element 522a and the lower rear cross member 522b are connected together by a left connecting block 523a and a right connecting block 532b. The left connecting block 523a is disposed on the left of the link support 212. The right connecting block 523b is disposed on the right of the link support 212.

Returning to FIG. 2, the lower cross member 52 is disposed below the upper cross member 51. The lower cross member 52 extends parallel to the upper cross member 51. A middle portion of the lower cross member 52 is connected to the link support 212 by a connecting portion I. The lower cross member 52 is able to turn about a middle down or lower axis Md that passes through the connecting portion I to extend in the front-and-rear direction of the body frame 21.

A left end portion of the lower cross member 52 is connected to the left side member 53 by a connecting portion G. The lower cross member 52 is able to turn about a left lower axis which passes through the connecting portion G to extend in the front-and-rear direction of the body frame 21.

A right end portion of the lower cross member 52 is connected to the right side member 54 by a connecting portion H. The lower cross member 52 is able to turn about a right lower axis which passes through the connecting portion H to extend in the front-and-rear direction of the body frame 21. A length of the upper cross member 51 from the connecting portion E to the connecting portion A is equal or substantially equal to a length of the lower cross member from the connecting portion H to the connecting portion G.

The middle upper axis Mu, the right upper axis, the left upper axis, the middle lower axis Md, the right lower axis, and the left lower axis extend parallel to one another. The middle upper axis Mu, the right upper axis, the left upper axis, the middle lower axis Md, the right lower axis, and the left lower axis are disposed above the left front wheel 31 and the right front wheel 32.

As shown in FIGS. 2 and 4, the left side member 53 is disposed on the left of the link support 212. The left side member 53 is disposed above the left front wheel 31. The left side member 53 extends parallel to the middle steering axis Z of the link support 212. An upper portion of the left side member 53 is disposed behind a lower portion thereof.

A lower portion of the left side member 53 is connected to the left bracket 317. The left bracket 317 is able to turn about a left steering axis X relative to the left side member 53. The left steering axis X extends parallel to the middle steering axis Z of the link support 212.

As shown in FIGS. 2 and 4, the right side member 54 is disposed on the right of the link support 212. The right side member 54 is disposed above the right front wheel 32. The right side member 54 extends parallel to the middle steering axis Z of the link support 212. An upper portion of the right side member 54 is disposed behind a lower portion thereof.

A lower portion of the right side member 54 is connected to the right bracket 327. The right bracket 327 is able to turn about a right steering axis Y relative to the right side member 54. The right steering axis Y extends parallel to the middle steering axis Z of the link support 212.

Thus, as has been described above, the upper cross member 51, the lower cross member 52, the left side member 53, and the right side member 54 are supported by the link support 212 so that the upper cross member 51 and the lower cross member 52 are held in postures which are parallel to each other and so that the left side member 53 and the right side member 54 are held in postures which are parallel to each other.

As shown in FIGS. 2 and 4, the steering force transmission 6 includes a middle transmission plate 61, a left transmission plate 62, a right transmission plate 63, a middle joint 64, a left joint 65, a right joint 66, and the tie-rod 67.

The middle transmission plate 61 is connected to a lower portion of the downstream side steering shaft 68. The middle transmission plate 61 cannot turn relative to the downstream side steering shaft 68. The middle transmission plate 61 is able to turn about the middle steering axis Z relative to the link support 212.

The left transmission plate 62 is disposed on the left of the middle transmission plate 61. The left transmission plate 62 is connected to the left bracket 317. The left transmission plate 62 cannot turn relative to the left bracket 317. The left transmission plate 62 is able to turn about the left steering axis X relative to the left side member 53.

The right transmission plate 63 is disposed on the right of the middle transmission plate 61. The right transmission plate 63 is connected to the right bracket 327. The right transmission plate 63 cannot turn relative to the right bracket 327. The right transmission plate 63 is able to turn about the right steering axis Y relative to the right side member 54.

As shown in FIG. 4, the middle joint 64 is connected to a front portion of the middle transmission plate 61 via a shaft portion that extends in the up-and-down direction of the body frame 21. The middle transmission plate 61 and the middle joint 64 are able to turn relative to each other about this shaft portion.

The left joint 65 is disposed directly on the left of the middle joint 64. The left joint 65 is connected to a front portion of the left transmission plate 62 via a shaft that extends in the up-and-down direction of the body frame 21. The left transmission plate 62 and the left joint 65 are able to turn relative to each other about this shaft portion.

The right joint 66 is disposed directly on the right of middle joint 64. The right joint 66 is connected to a front portion of the right transmission plate 63 via a shaft that extends in the up-and-down direction of the body frame 21. The right transmission plate 63 and the right joint 66 are able to turn relative to each other about this shaft portion.

A shaft portion that extends in the front-and-rear direction of the body frame 21 is provided at a front portion of the middle joint 64. A shaft portion that extends in the front-and-rear direction of the body frame 21 is provided at a front portion of the left joint 65. A shaft portion that extends in the front-and-rear direction of the body frame 21 is provided at a front portion of the right joint 66.

The tie-rod 67 extends in the left-and-right direction of the body frame 21. The tie-rod 67 is connected to the middle joint 64, the left joint 65, and the right joint 66 via those shaft portions. The tie rod 67 and the intermediate joint 64 are able to turn relatively about the shaft portion which is provided at the front portion of the intermediate joint 64. The tie-rod 67 and the left joint 65 are able to turn relative to each other about the shaft portion that is provided at the front portion of the left joint 65. The tie rod 67 and the right joint 66 are able to turn relative to each other about the shaft portion that is provided at the front portion of the right joint 66.

Figure 5:
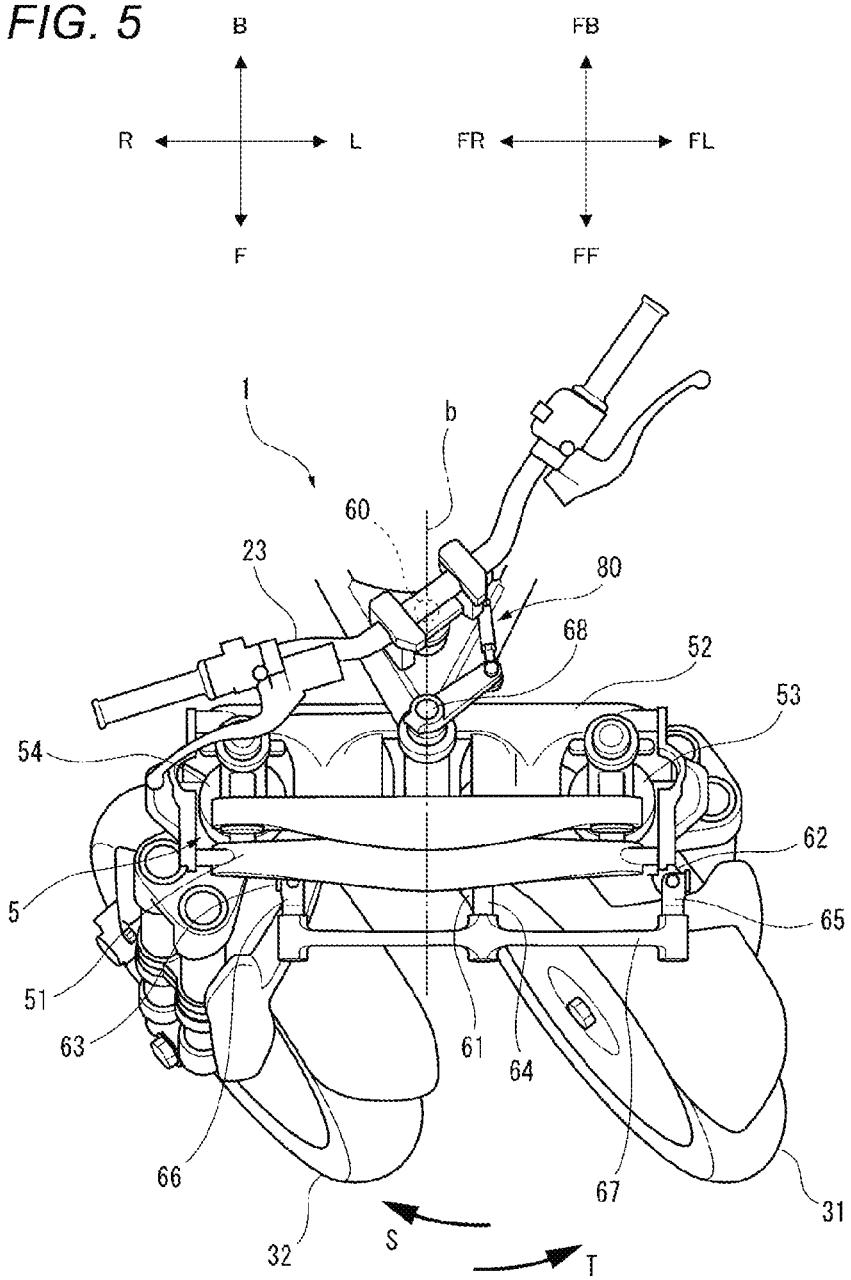
FIG. 5 is a plan view showing the front portion of the vehicle shown in FIG. 1 when the vehicle is steered.

Next, referring to FIGS. 4 and 5, a steering operation of the vehicle 1 will be described. FIG. 5 is a plan view, as seen from above the body frame 21, of the front portion of the vehicle 1 with the left front wheel 31 and the right front wheel 32 turned or steered to the left.

When the rider operates the handlebar 23, the upstream side steering shaft 60 turns. The turning motion of the upstream side steering shaft 60 is transmitted to the downstream side steering shaft 68 via the connecting member 80. The downstream side steering shaft 68 turns relative to the link support 212 about a front steering axis b. In the case of the left front wheel 31 and the right front wheel 32 being turned to the left as shown in FIG. 5, as the handlebar 23 is operated, the middle transmission plate 61 turns relative to the link support 212 in a direction indicated by an arrow T about the front steering axis b.

In association with the turning of the middle transmission plate 61 in the direction indicated by the arrow T, the middle joint 64 of the tie-rod 67 turns relative to the middle transmission plate 61 in a direction indicated by an arrow S. This moves the tie-rod 67 leftward and rearward with its posture kept unchanged.

As the tie-rod 67 moves leftward and rearward, the left joint 65 and the right joint 66 of the tie-rod 67 turn in the direction indicated by the arrow S relative to the left transmission plate 62 and the right transmission plate 63, respectively. This causes the left transmission plate 62 and the right transmission plate 63 to turn in the direction indicated by the arrow T with the tie rod 67 maintaining its posture unchanged.

When the left transmission plate 62 turns in the direction indicated by the arrow T, the left bracket 317, which cannot turn relative to the left transmission plate 62, turns in the direction indicated by the arrow T about the left steering axis X relative to the left side member 53.

When the right transmission plate 63 turns in the direction indicated by the arrow T, the right bracket 327, which cannot turn relative to the right transmission plate 63, turns in the direction indicated by the arrow T about the right steering axis Y relative to the right side member 54.

When the left bracket 317 turns in the direction indicated by the arrow T, the left shock absorber 33, which is connected to the left bracket 317 via the left front outer tube 333 and the left rear outer tube 335, turns in the direction indicated by the arrow T about the left steering axis X relative to the left side member 53. When the left shock absorber 33 turns in the direction indicated by the arrow T, the left front wheel 31, which is supported on the left shock absorber 33, turns in the direction indicated by the arrow T about the left steering axis X relative to the left side member 53.

When the right bracket 327 turns in the direction indicated by the arrow T, the right shock absorber 34, which is connected to the right bracket 327 via the right front outer tube 343 and the right rear outer tube 345, turns in the direction indicated by the arrow T about the right steering axis Y relative to the right side member 54. When the right shock absorber 34 turns in the direction indicated by the arrow T, the right front wheel 32, which is supported on the right shock absorber 34, turns in the direction indicated by the arrow T about the right steering axis Y relative to the right side member 54.

When the rider operates the handlebar 23 so as to turn the left front wheel 31 and the right front wheel 32 to the right, the elements described above turn in the direction indicated by the arrow S. Since the elements move the other way around in relation to the left-and-right direction, detailed description thereof will be omitted here.

Thus, as has been described above, as the rider operates the handlebar 23, the steering force transmission 6 transmits the steering force accordingly to the left front wheel 31 and the right front wheel 32. The left front wheel 31 and the right front wheel 32 turn about the left steering axis X and the right steering axis Y, respectively, in the direction corresponding to the direction in which the handlebar 23 is operated by the rider.

Figure 6:
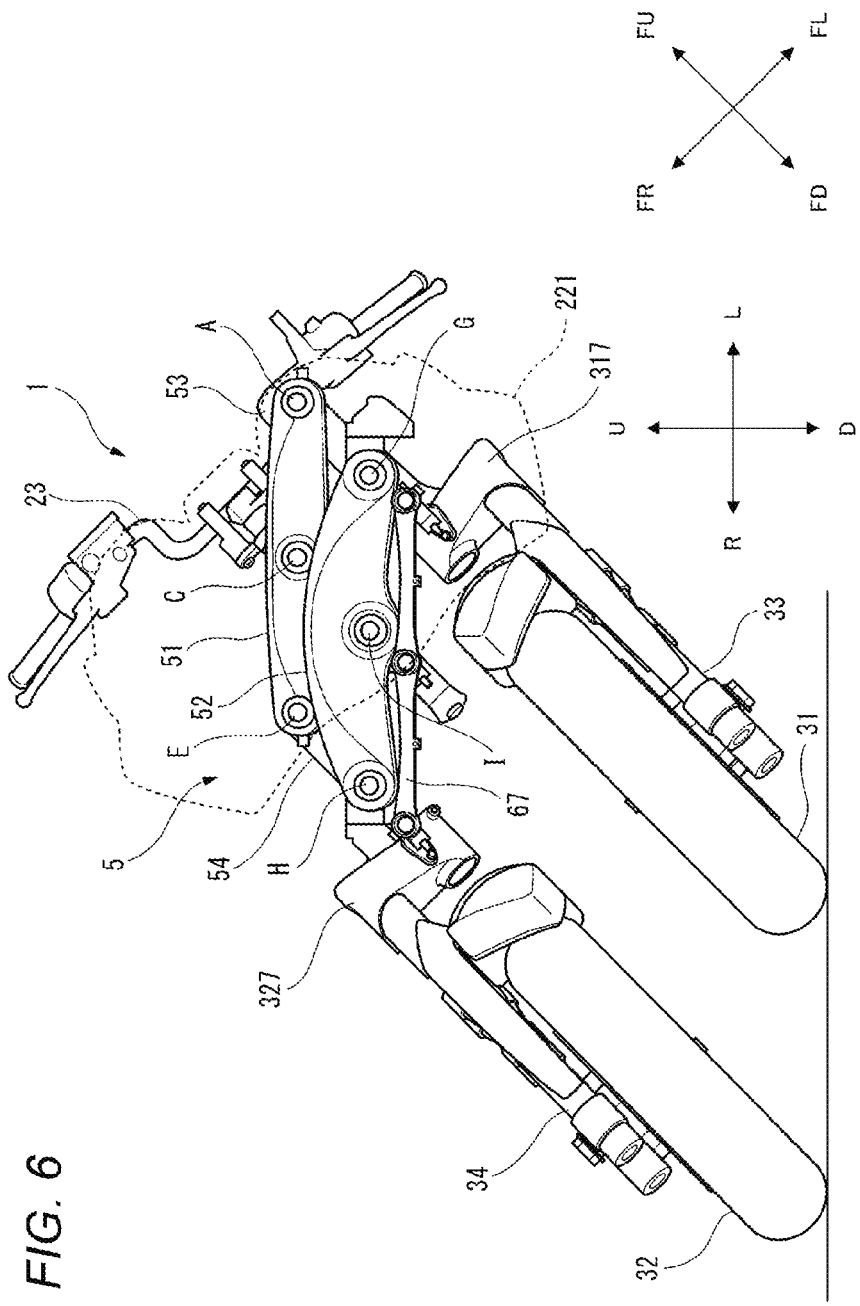
FIG. 6 is a front view showing the front portion of the vehicle shown in FIG. 1 when the vehicle is caused to lean.

Next, referring to FIGS. 2 and 6, a leaning operation of the vehicle 1 will be described. FIG. 6 is a front view of the front portion of the vehicle 1 as viewed from the front of the body frame 21, showing a state in which the body frame 21 leans to the left of the vehicle 1. FIG. 6 shows a state in which the front portion of the leaning vehicle 1 is seen through the front cover 221 that is indicated by dashed lines.

As shown in FIG. 2, with the vehicle 1 standing in the upright state, when looking at the vehicle 1 from the front of the body frame 21, the linkage 5 has a rectangular or substantially rectangular shape. As shown in FIG. 6, with the vehicle 1 leaning to the left, when looking at the vehicle 1 from the front of the body frame 21, the linkage 5 has a parallelogram shape.

The deformation of the linkage 5 is interlocked with the leaning of the body frame 21 in the left-and-right direction of the vehicle 1. The operation of the linkage 5 means that the upper cross member 51, the lower cross member 52, the left side member 53, and the right side member 54 that define the linkage 5 turn relatively about turning axes which pass through the corresponding connecting portions A, C, E, G, H, I, such that the shape of the linkage 5 changes.

For example, as shown in FIG. 6, when the rider causes the vehicle 1 to lean to the left, the link support 212 leans to the left relative to the vertical direction. When the link support 212 leans, the upper cross member 51 turns counterclockwise as seen from the front of the vehicle 1 about the middle upper axis Mu that passes through the connecting portion C relative to the link support 212. Similarly, the lower cross member 52 turns counterclockwise as seen from the front of the vehicle 1 about the middle lower axis Md that passes through the connecting portion I relative to the link support 212. This causes the upper cross member 51 to move to the left relative to the lower cross member 52.

As the upper cross member 51 moves to the left, the upper cross member 51 turns counterclockwise as seen from the front of the vehicle 1 about the left upper axis that passes through the connecting portion A and the right upper axis that passes through the connecting portion E relative to the left side member 53 and the right side member 54, respectively. Similarly, the lower cross member 52 turns counterclockwise as seen from the front of the vehicle 1 about the left lower axis that passes through the connecting portion G and the right lower axis that passes through the connecting portion H relative to the left side member 53 and the right side member 54, respectively. This causes the left side member 53 and the right side member 54 to lean to the left relative to the vertical direction with their postures kept parallel to the link support 212.

As this occurs, the lower cross member 52 moves to the left relative to the tie-rod 67. As the lower cross member 52 moves to the left, the shaft portions that are provided at the respective front portions of the middle joint 64, the left joint 65, and the right joint 66 turn relative to the-tie rod 67. This allows the tie-rod 67 to hold a parallel posture to the upper cross member 51 and the lower cross member 52.

As the left side member 53 leans to the left, the left bracket 317, which is connected to the left side member 53, leans to the left. As the left bracket 317 leans to the left, the left shock absorber 33, which is connected to the left bracket 317, leans to the left. As the left shock absorber 33 leans to the left, the left front wheel 31, which is supported on the left shock absorber 33, leans to the left with its posture kept parallel to the link support 212.

As the right side member 54 leans to the left, the right bracket 327, which is connected to the right side member 54, leans to the left. As the right bracket 327 leans to the left, the right shock absorber 34, which is connected to the right bracket 327, leans to the left. As the right shock absorber 34 leans to the left, the right front wheel 32, which is supported on the right shock absorber 34, leans to the left with its posture kept parallel to the link support 212.

The leaning operations of the left front wheel 31 and the right front wheel 32 are described based on the vertical direction. However, when the vehicle 1 leans (when the linkage 5 is activated to operate), the up-and-down direction of the body frame 21 does not coincide with the vertical up-and-down direction. In a case in which the leaning operations are described based on the up-and-down direction of the body frame 21, when the linkage 5 is activated to operate, the relative positions of the left front wheel 31 and the right front wheel 32 to the body frame 21 change. In other words, the linkage 5 changes the relative positions of the left front wheel 31 and the right front wheel 32 to the body frame 21 in the up-and-down direction of the body frame 21 to cause the body frame 21 to lean relative to the vertical direction.

When the rider causes the vehicle 1 to lean to the right, the elements lean to the right. Since the elements move the other way around in relation to the left-and-right direction, detailed description thereof will be omitted here.

Figure 7:
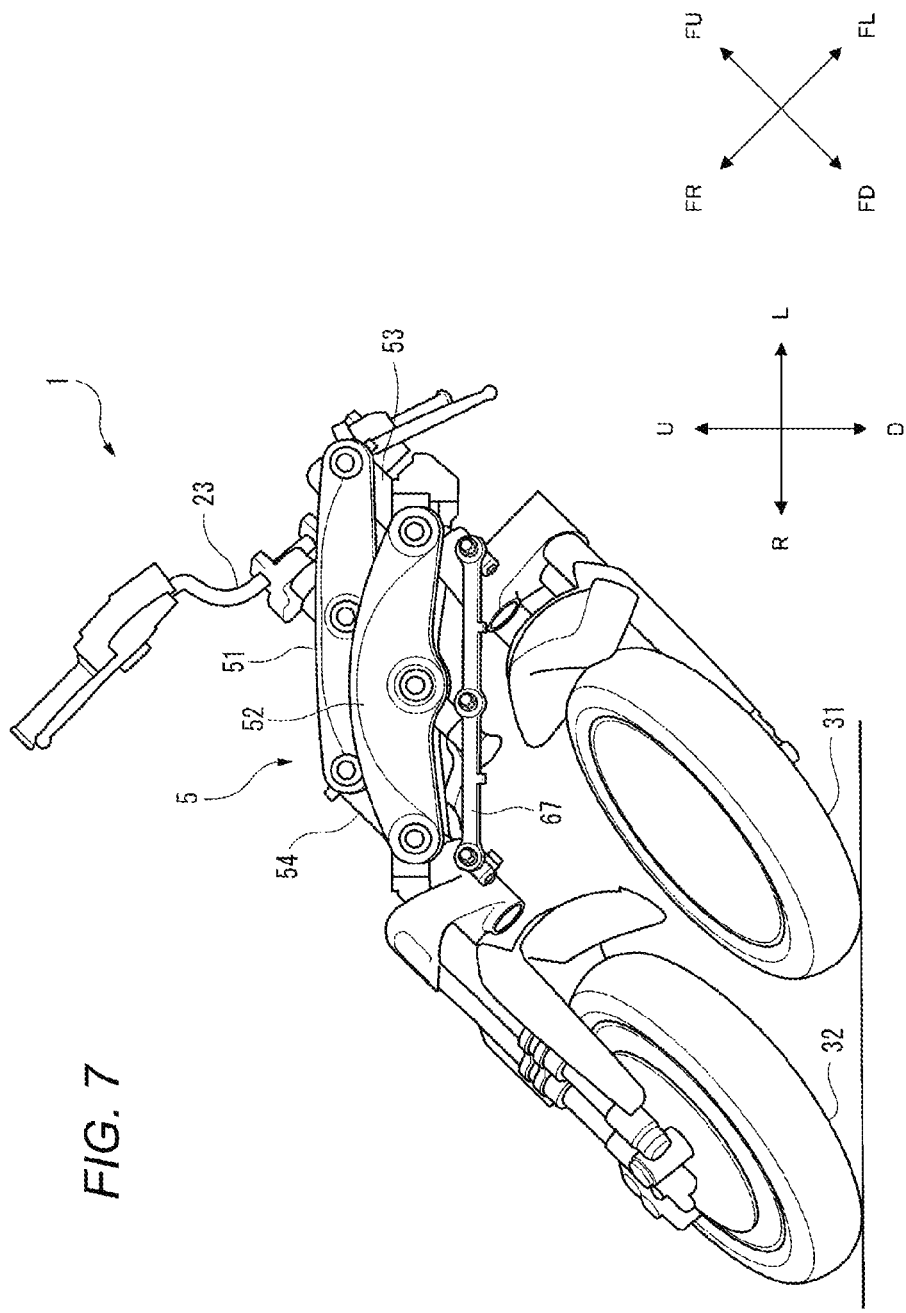
FIG. 7 is a front view showing the front portion of the vehicle shown in FIG. 1 when the vehicle is caused to lean while being steered.

FIG. 7 is a front view of the front portion of the vehicle with the vehicle 1 leaning and steered. FIG. 7 shows a state in which the vehicle 1 is steered to the left while leaning to the left. The steering operation turns the left front wheel 31 and the right front wheel 32 to the left, and the leaning operation causes the left front wheel 31 and the right front wheel 32 to lean to the left together with the body frame 21. More specifically, in this state, the linkage 5 exhibits the parallelogram shape, and the tie-rod 67 moves towards the left and rear of the body frame 21 from its position that the tie-rod 67 takes when the body frame 21 stays in the upright state.

Thus, as has been described above, the vehicle 1 of this preferred embodiment includes the body frame 21 that leans to the right of the vehicle 1 when the vehicle 1 turns right and leans to the left of the vehicle 1 when the vehicle 1 turns left; the right front wheel 32 that is able to turn about the right steering axis that extends in the up-and-down direction of the body frame 21; the left front wheel 31 that is provided on the left of the right front wheel 32 in the left-and-right direction of the body frame 21 and that is able to turn about the left steering axis that is parallel to the right steering axis; the right shock absorber 34 that supports the right front wheel 32 at the lower portion of the right shock absorber 34 and absorbs the displacement of the right front wheel 32 in the up-and-down direction of the body frame 21 towards the upper portion of the right shock absorber 34; the left shock absorber 33 that supports the left front wheel 31 at the lower portion of the left shock absorber 33 and absorbs the displacement of the left front wheel 31 in the up-and-down direction of the body frame 21 towards the upper portion of the left shock absorber 33; and the linkage 5 that supports the right front wheel 32 and the left front wheel 31 so as to be displaced relative to each other in the up-and-down direction of the body frame 21.

The linkage 5 preferably includes the right side member 54 that supports the upper portion of the right shock absorber 34 so as to turn about the right steering axis; the left side member 53 that supports the upper portion of the left shock absorber 33 so as to turn about the left steering axis; the upper cross member 51 that supports the upper portion of the right side member 54 at the right end portion thereof so as to turn about the right upper axis that extends in the front-and-rear direction of the body frame 21, supports the upper portion of the left side member 53 at the left end portion thereof so as to turn about the left upper axis that is parallel to the right upper axis, and is supported on the body frame 21 at the middle portion thereof so as to turn about the middle upper axis Mu that is parallel to the right upper axis and the left upper axis; and the lower cross member 52 that supports the lower portion of the right side member 54 at the right end portion thereof so as to turn about the right lower axis that is parallel to the right upper axis, supports the lower portion of the left side member 53 so as to turn about the left lower axis that is parallel to the left upper axis, and is supported on the body frame 21 at the middle portion thereof so as to turn about the middle lower axis Md that is parallel to the middle upper axis Mu.

Next, the body frame 21 will be described in detail.

Figure 8:
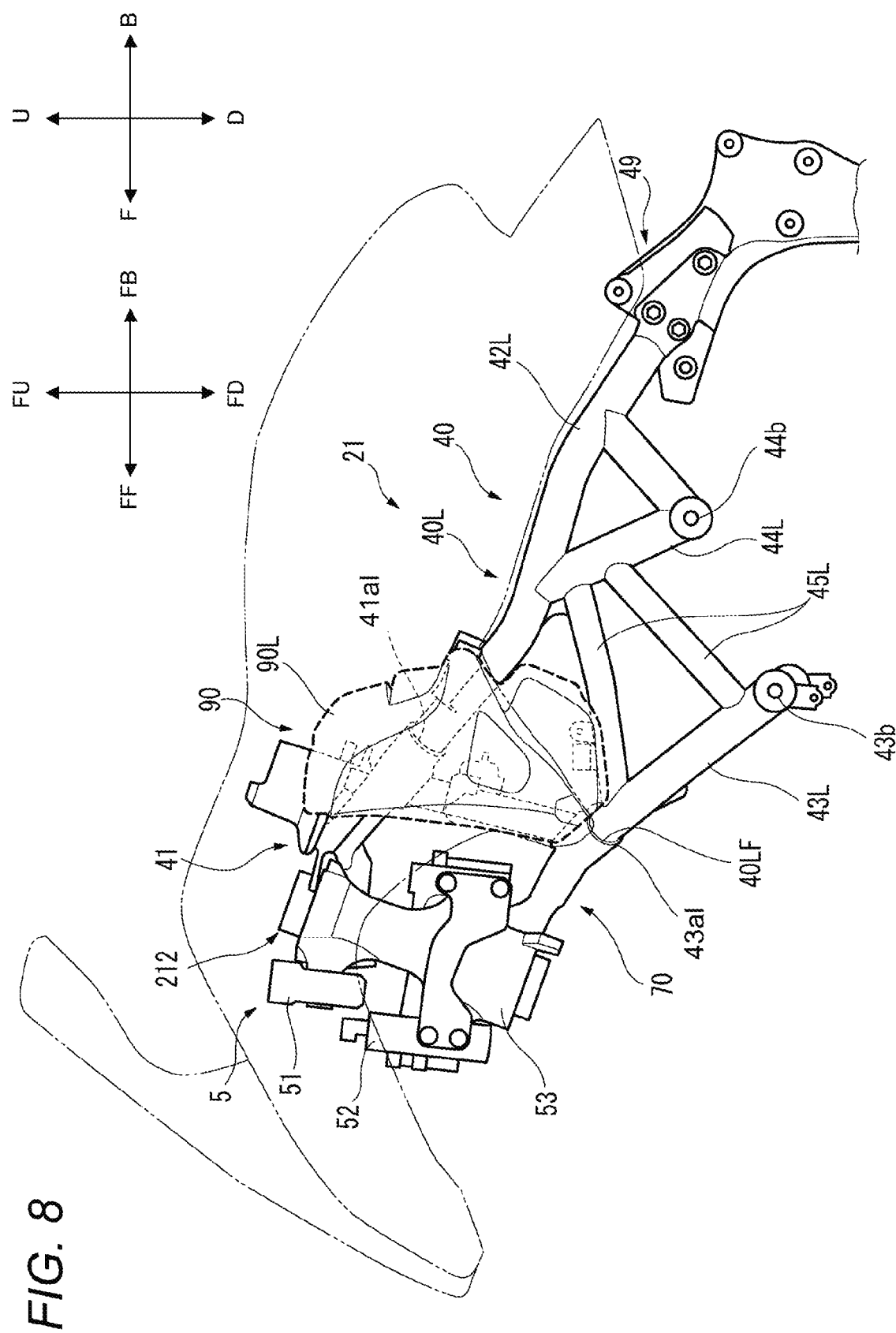
FIG. 8 is a side view of a body frame.
Figure 9:
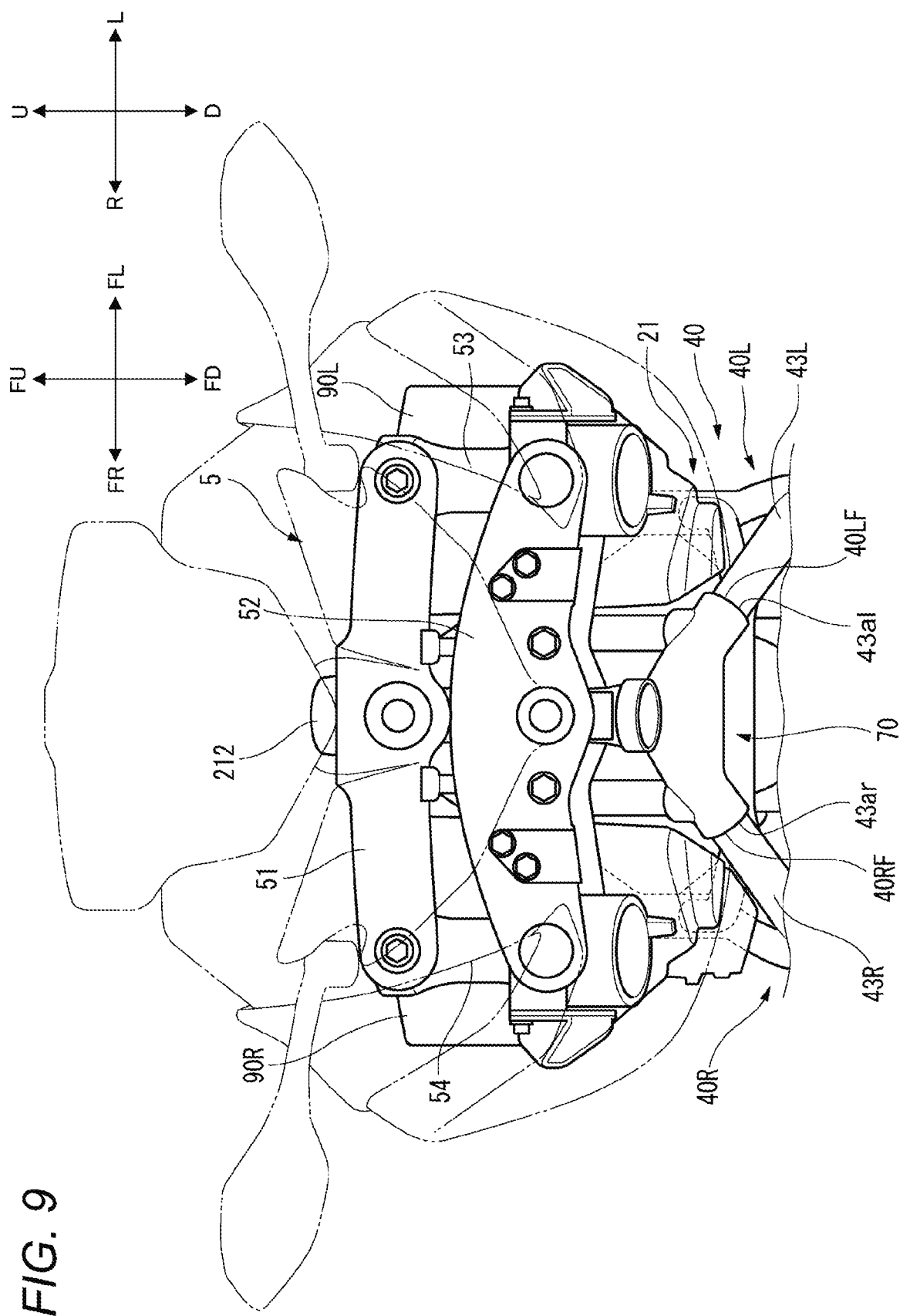
FIG. 9 is a front view showing a front portion of the body frame.

FIG. 8 is a perspective view of the body frame 21. FIG. 9 is a front view showing a front portion of the body frame 21.

As shown in FIGS. 8 and 9, the body frame 21 includes a main frame 40, an upper bracket 41, a connecting bracket 70, and the link support 212. The main frame 40 extends in at least the front-and-rear direction of the vehicle 1.

The main frame 40 supports a vehicle mounted component such as the engine unit 25 (refer to FIG. 1). The main frame 40 includes a right frame 40R and a left frame 40L that is provided on the left of the right frame 40R. A front upper portion of the right frame 40R and a front upper portion of the left frame 40L are connected to an upper portion of the link support 212 via the upper bracket 41. A front lower portion of the right frame 40R and a front lower portion of the left frame 40L are connected to a lower portion of the link support 212 via the connecting bracket 70.

In this preferred embodiment, the right frame 40R and the left frame 40L each preferably include a plurality of metallic pipes that are connected to one another.

The right frame 40R extends in at least the front-and-rear direction of the vehicle 1. The right frame 40R supports right portions of the vehicle mounted components excluding the body frame 21.

The left frame 40L is provided directly on the left of the vehicle 1 relative to the right frame 40R. The left frame 40L extends in at least the front-and-rear direction of the vehicle 1. The left frame 40L supports left portions of the vehicle mounted components excluding the body frame 21.

In this preferred embodiment, the right frame 40R and the left frame 40L support the engine unit 25 (refer to FIG. 1) and a rear bracket 49 as vehicle mounted components.

In this preferred embodiment, the right frame 40R preferably has a structure that is laterally symmetrical with that of the left frame 40L. Due to this, the left frame 40L will be described below with reference to FIG. 8, and a detailed description of the right frame 40R will be omitted here. For reference numerals of respective members of the right frame 40R, R is listed in place of L at the end of each of the reference numerals of the respective corresponding members of the left frame 40L.

The left frame 40L includes a left upper frame 42L, a left lower frame 43L, a left engine support 44L, and left vertical frames 45L.

The left upper frame 42L and the left lower frame 43L extend in the front-and-rear direction of the vehicle 1. The left upper frame 42L and the left lower frame 43L are preferably made of one or more pipes. The left engine support 44L is provided on the left upper frame 42L at a middle portion of the left upper frame 42L in the front-and-rear direction of the vehicle 1.

The left engine support 44L is provided by, for example, welding two pipes to the left upper frame 42L. A first left fastening hole 44b is provided in the left engine support 44L, so that a first fastening bolt is inserted through the first left fastening hole 44b to be fastened to a left portion of the engine unit 25. A second left fastening hole 43b is provided at a rear end of the left lower frame 43L, so that a second fastening bolt is inserted through the second left fastening hole 43b to be fastened to the left portion of the engine unit 25. The left portion of the engine unit 25 is supported on the left frame 40L by the first fastening bolt and the second fastening bolt. The engine unit 25 is fixed to the left engine support 44L of the body frame 21 so as not to be displaced.

The two left vertical frames 45L connect the left engine support 44L and the left lower frame 43L together. The left vertical frames 45L preferably include one or more pipes. The left engine support 44L and upper portions of the left vertical frames 45L are connected together and the left lower frame 43L is connected to lower portion of the left vertical frames 45L.

The rear bracket 49 is connected to a rear end of the left upper frame 42L. The left frame 40L supports a left portion of the rear bracket 49. A rear suspension suspends the rear wheel 4 and is attached to the rear bracket 49.

The upper bracket 41 connects a front portion of the right upper frame 42R and a front portion of the left upper frame 42L to the link support 212. The upper bracket 41 is preferably a monolithic metallic member made by, for example, casting. The upper bracket 41 is welded, for example, to a rear surface of an upper portion of the link support 212. Two insertion holes 41ar, 41a1 that open to the rear are provided in a rear portion of the upper bracket 41. The front portion of the right upper frame 42R and the front portion of the left upper frame 42L are welded, for example, to the upper bracket 41 while being inserted into the corresponding insertion holes 41ar, 41a1, respectively. The link support 212 is connected to the right upper frame 42R and the left upper frame 42L via the upper bracket 41.

The link support 212 extends in the up-and-down direction of the body frame 21. The link support 212 is provided ahead of front ends 40RF, 40LF of the right frame 40R and the left frame 40L. In this preferred embodiment, a frontmost portion of a portion of the right lower frame 43R, which preferably includes one or more pipes that are exposed to an exterior, is called the front end 40RF of the right frame 40R. A frontmost portion of a portion of the left lower frame 43L, which preferably includes one or more pipes that are exposed to an exterior, is called the front end 40LF of the left frame 40L.

The connecting bracket 70 connects a front portion of the right lower frame 43R and a front portion of the left lower frame 43L of the link support 212 to the link support 212. The connecting bracket 70 is, for example, a monolithic metallic member made by, for example, casting. The connecting bracket 70 is welded, for example, to a rear surface of a lower portion of the link support 212. Two insertion holes 43ar, 43al that open to the rear are provided in a rear portion of the connecting bracket 70. The front end 40RF of the right upper frame 43R and the front end 40LF of the left upper frame 42L are welded, for example, to the connecting bracket 70 while being inserted into the corresponding insertion holes 43ar, 43a1, respectively. The link support 212 is connected to the right lower frame 43R and the left lower frame 43L via the connecting bracket 70.

As shown in FIGS. 8 and 9, the vehicle 1 includes a waterproof cover 90. The waterproof cover 90 is attached to a portion of the body frame 21. The waterproof cover 90 includes a right waterproof cover 90R and a left waterproof cover 90L that is preferably separate from the right waterproof cover 90R. The right waterproof cover 90R and the left waterproof cover 90L are preferably made of, for example, resin. In this preferred embodiment, the right waterproof cover 90R is separate from the body cover 22, and the left waterproof cover 90L is separate from the body cover 22.

The right waterproof cover 90R is attached to a portion of the vehicle 1. As shown in FIG. 9, the right waterproof cover 90R is mounted such that at least a portion of the right waterproof cover 90R overlaps the right side member 54 when looking at the vehicle 1 standing in the upright state from the front of the vehicle 1. The left waterproof cover 90L is mounted such that at least a portion of the left waterproof cover 90L overlaps the left side member 53 when looking at the vehicle 1 standing in the upright state from the front of the vehicle 1.

It is preferable that a right edge of the right waterproof cover 90R is located rightward of a right edge of the right side member 54 when the vehicle 1 stands in the upright state. It is preferable that a left edge of the right waterproof cover 90R is located leftward of a left edge of the right side member 54 when the vehicle 1 leans to the right or the left to the maximum extent. It is preferable that the upper edge of the right waterproof cover 90R is located above the upper edge of the right side member 54 when the vehicle 1 leans to the right to the maximum extent. It is preferable that a lower edge of the right waterproof cover 90R is located below a lower edge of the right side member 54 when the vehicle 1 leans to the left to the maximum extent. By using this structure, no matter which posture the vehicle 1 takes, the right side member 54 overlaps the right waterproof cover 90R at all times when looking at the vehicle 1 from the front of the vehicle 1.

It is preferable that a left edge of the left waterproof cover 90L is located leftward of a left edge of the left side member 53 when the vehicle 1 stands in the upright state. It is preferable that a right edge of the left waterproof cover 90L is located rightward of a right edge of the left side member 53 when the vehicle 1 leans to the right or the left to a maximum extent. It is preferable that an upper edge of the left waterproof cover 90L is located above an upper edge of the left side member 53 when the vehicle 1 leans to the left to the maximum extent. It is preferable that a lower edge of the left waterproof cover 90L is located below a lower edge of the left side member 53 when the vehicle 1 leans to the right to the maximum extent. By using this structure, no matter which posture the vehicle 1 takes, the left side member 53 overlaps the left waterproof cover 90L at all times when looking at the vehicle 1 from the front of the vehicle 1.

When the vehicle 1 standing in the upright state is seen from a left side of the vehicle 1 as shown in FIG. 8, the right waterproof cover 90R is attached to a portion of the body frame 21 that is located behind a rear end of the right side member 54 and ahead of a right engine support 44R of the body frame 21. In this preferred embodiment, the right waterproof cover 90R is attached to the upper bracket 41 and the connecting bracket 70.

When the vehicle 1 standing in the upright state is seen from the left side of the vehicle 1 as shown in FIG. 8, the left waterproof cover 90L is attached to a portion of the body frame 21 that is located behind a rear end of the left side member 53 and ahead of a left engine support 44L of the body frame 21. In this preferred embodiment, the left waterproof cover 90L is attached to the upper bracket 41 and the connecting bracket 70.

The vehicle 1 includes a fuel tank (whose illustration is omitted) disposed directly above the engine unit (an engine) 25. The fuel tank is covered by an upper cover 93 (refer to FIG. 1) that defines a portion of the body cover 22. The right waterproof cover 90R and the left waterproof cover 90L are preferably separate from the body cover 22 including the upper cover 93.

The vehicle 1 including the structure described above has a rigid engine structure in which the engine unit 25 is fixed to the engine supports 44L, 44R so as not to be displaced directly behind the linkage 5 on the body frame 21. In the vehicle 1 including the rigid engine structure, the inventor has discovered that a portion of the body frame 21 tends to rust easily as described below.

In the vehicle 1 having the rigid engine structure, the body frame 21 is heated by heat that the engine unit 25 emits. The inventor discovered a possibility that the body frame 21 rusts when the body frame 21 is so heated.

The inventor has also discovered that rust tends to be caused at a location that satisfies three conditions: the location is exposed to a certain temperature; the location is splashed with water; and the location is not dried quickly.

It is preferable that the engine unit 25 is supported over a wide span. On the other hand, it is preferable that the vehicle 1 is not expanded in the widthwise direction. Additionally, the engine unit 25 should be positively cooled. When providing a cover, a space where to accommodate the cover is necessary, and the cover cuts off a flow of running air. Then, the periphery of the support of the engine unit 25 is not covered with a cover on many occasions. Due to this, a body frame portion 21 of the body frame 21 that supports the engine unit 25 is not covered so as to be exposed to outside air. Additionally, heat is conducted sufficiently to the body frame portion 21 and is hence easily dried. Due to this, this body frame portion tends to be subjected to a flow of outside air and be dried easily, and hence, the body frame portion does not rust easily.

On the other hand, the heat of the engine unit 25 is not easily conducted to a body frame portion located on the periphery of the linkage 5 that is disposed far away from the engine unit 25, and hence, this body frame portion does not rust easily.

The inventor has discovered that a middle body frame portion located in the middle of the body frame 21 between the engine unit 25 and the linkage 5 (hereinafter, referred to as a middle body frame portion) tends to rust easily when compared with the two body frame portions described above. The reason that the middle body frame portion tends to rust easily is as follows.

The middle body frame portion extends from the portion that supports the linkage 5 towards the engine supports 44L, 44R and is inevitably positioned directly behind the linkage 5 on the body frame 21.

Water splashed up by the right front wheel 32 adheres to the right side member 54, and water carried by running air spreads from this right side member 54 and adheres to the middle body frame portion. Alternatively, water splashed up by the right front wheel 32 flies directly to the middle body frame portion and adheres to it. Similarly, water splashed up by the left front wheel 31 adheres to the left side member 53, and water carried by running air spreads from the left side member 53 and adheres to the middle body frame portion. Alternatively, water splashed up by the left front wheel 31 flies directly to the middle body frame portion and adheres to it. Water splashed up by tires contains mud, and hence, the body frame 21 easily rusts.

Further, the middle frame portion is warmed to a certain temperature. At least a portion of running air that flows to the linkage 5 from the front is interrupted by the linkage 5. Namely, a space directly behind the linkage 5 is an area into which air does not tend to flow easily. When the vehicle 1 is at a stop, air that flows in from the front is interrupted by the linkage 5 and does not flow into the space easily, such that air in the space tends to easily become stagnant. In addition, when the vehicle 1 is running, water adhering to the right side member 54 and the left side member 53 is carried by running air that has passed through the linkage 5 and spreads to the middle body frame portion and adheres to it. With the vehicle 1 standing at a stop, the air in the space remains stagnant, and this stopped state tends to in general extend longer than the running state of the vehicle 1. More specifically, the middle body frame portion has a condition in which it is not dried easily over a long period of time.

Because of this, the middle body frame portion satisfies the three conditions: the middle body frame portion is warmed to a certain temperature; water adheres to the middle body frame portion; and the middle body frame portion is not dried easily. The inventor has discovered from these situations that a rust preventive measure should be taken particularly on the middle body frame portion.

In this preferred embodiment, the waterproof cover 90 is mounted on the middle body frame portion of the body frame 21 at a location where the waterproof cover 90 overlaps at least a portion of at least one of the right side member 54 and the left side member 53 when the vehicle 1 standing in the upright state and seen from the front of the vehicle 1. Due to this, even though water adhering to the right side member 54 and the left side member 53 is carried by running air and spreads rearward, the water adheres to the waterproof cover 90, such that the middle body frame portion, which would tend to rust easily otherwise, is prevented from being splashed with the water. This significantly reduces or prevents the middle body frame portion from rusting.

When looking at the vehicle 1 from the front of the vehicle 1, the body cover 22 opens to the front so that at least a portion of the linkage 5 is exposed. In addition, the body cover 22 defines a gap between an upper edge of the right front wheel 32 and an upper edge of the left front wheel 31 and a lower edge of a front portion of the body frame 22 when the vehicle 1 standing in the upright state is not steered. This provides the body cover 22 with a compact structure.

In the vehicle 1 including the body cover 22 described above, some scattering drops of muddy water splashed up by the right front wheel 32 adhere directly to the right side member 54 and other drops are carried to a space defined between the right front wheel 32 and the left front wheel 31. In addition, some scattering drops of muddy water splashed up by the left front wheel 31 adhere directly to the left side member 53 and other drops are carried to the space defined between the right front wheel 32 and the left front wheel 31. The scattering drops of muddy water carried to the space between the right front wheel 32 and the left front wheel 31 are carried further around to the front of the linkage 5 by running air. Then, the scattering drops of muddy water enter an inside of the body cover 22 from the opening in the body cover 22 and adhere to the linkage 5. Thus, muddy water adheres to the engine supports 44R, 44L through the route described above.

In this preferred embodiment, however, the muddy water that enters from the opening in the body cover 22 to adhere to the linkage 5 adheres to the waterproof cover 90, and thus, it becomes difficult for the muddy water to be splashed over the middle body frame portion. This significantly reduces or prevents the middle body frame portion of the body frame 21, which tends to easily rust, from rusting.

The vehicle 1 preferably has a so-called outboard suspension system in which the right shock absorber 34 is provided directly on the right of the right front wheel 32 and the left shock absorber 33 is provided directly on the left of the left front wheel 31.

Different from preferred embodiments of the present invention, a vehicle including a right shock absorber provided on the left of a right front wheel 32 and a left shock absorber provided on the right of a left front wheel 31 is called a vehicle having an inboard suspension system. In the vehicle having the inboard suspension system, water splashed up by the right front wheel 32 adheres to the right shock absorber, and water splashed up by the left front wheel 31 adheres to the left shock absorber. Due to this, in the vehicle having the inboard suspension system, scattering drops of muddy water do not easily enter a space defined between the right front wheel 32 and the left front wheel 31.

However, in the vehicle 1 having the outboard suspension system in this preferred embodiment, scattering drops of muddy water splashed up by the right front wheel 32 are not interrupted by anything and are able to enter the space defined between the right front wheel 32 and the left front wheel 31. In addition, scattering drops of muddy water splashed up by the left front wheel 31 are not interrupted by anything and are able to enter this space. Because of this, in the vehicle 1 having the outboard suspension system, scattering drops of muddy water enters easily the space between the right front wheel 32 and the left front wheel 31 to adhere to the middle body frame portion. Due to this, the waterproof cover 90 effectively protects the vehicle 1 having the outboard suspension system.

A certain design property and a good external appearance are required of the body cover 22, and therefore, the shape of the body cover 22 and paint applied to the body cover 22 are regarded as important factors. The waterproof cover 90 is preferably separate from the upper cover 93 of the body cover 22. Therefore, the shape of the waterproof cover 90 is able to be designed freely without being restrained by the design property and the good external appearance required of the body cover 22. Additionally, the shape of the upper cover 93 is able to be designed separately from the shape of the waterproof cover 90, and a highly design-oriented shape is easily achieved for the upper cover 93.

Further, the waterproof cover 90 includes the right waterproof cover 90R and the left waterproof cover 90L which are separate from each other. When looking at the vehicle 1 standing upright from the front of the vehicle 1, the right waterproof cover 90R is located so as to overlap the right side member 54, and the left waterproof cover 90L is located so as to overlap the left side member 53. Because of this, since the waterproof cover 90 of this preferred embodiment is separated laterally in the left-and-right direction, the waterproof cover 90 is prevented from being enlarged in size and hence is compact in size.

In the preferred embodiments of the present invention described above, the vehicle 1 preferably has the so-called outboard suspension system, however, the present invention may be applied to a vehicle having a so-called inboard suspension system.

In the preferred embodiments of the present invention described above, the vehicle 1 preferably includes a fairing in which the periphery of the steering force transmission 6 is covered by the front cover 221. However, preferred embodiments of the present invention may be applied to a naked type vehicle in which the steering force transmission 6 is exposed to an exterior.

In the preferred embodiments of the present invention described above, the vehicle 1 preferably includes the single rear wheel 4. However, a plurality of rear wheels may be provided.

In the preferred embodiments of the present invention described above, the center of the rear wheel 4 in relation to the left-and-right direction of the body frame 21 coincides with the center of the distance between the left front wheel 31 and the right front wheel 32 in relation to the left-and-right direction of the body frame 21. Although the structure described above is preferable, the center of the rear wheel 4 in relation to the left-and-right direction of the body frame 21 may not coincide with the center of the distance between the left front wheel 31 and the right front wheel 32 in relation to the left-and-right direction of the body frame 21.

In the preferred embodiments of the present invention described above, the linkage 5 preferably includes the upper cross member 51 and the lower cross member 52. However, the linkage 5 may include a cross member other than the upper cross member 51 and the lower cross member 52. The "upper cross member" and the "lower cross member" are merely so called based on their relative positional relationship in the up-and-down direction. The upper cross member is not intended to imply an uppermost cross member in the linkage 5. The upper cross member refers to a cross member that is located above a cross member that is located therebelow. The lower cross member is not intended to imply a lowermost cross member in the linkage 5. The lower cross member refers to a cross member that is located below another cross member that is located thereabove. At least one of the upper cross member 51 and the lower cross member 52 may include two members of a right cross member and a left cross member. In this way, the upper cross member 51 and the lower cross member 52 may include a plurality of cross members as long as they maintain the link function.

When the word "parallel" is used in this description, it means that "parallel" also includes two straight lines which do not intersect each other as members while they are inclined within an angular range of about ±40 degrees, for example. When "along" is used in relation to a direction or a member in this specification, it means that a case is also included where the direction or the member is inclined within an angular range of about ±40 degrees, for example. When the expression reading "something extends in a certain direction" is used in this specification, it means that a case is also included where something extends in the certain direction while being inclined within an angular range of about ±40 degrees, for example, with respect to the certain direction.

The terms and expressions that are used herein are used to describe the preferred embodiments of the present invention and hence should not be construed as limiting the scope of the present invention. It should be understood that any equivalents to the characteristic matters which are shown and described herein should not be excluded and that various modifications within the scope of claims to be made later are permitted. The present invention can be embodied in many different forms.

This disclosure should be understood to provide preferred embodiments of the present invention. The preferred embodiments of the present invention are described herein based on the understanding that the present invention is not intended to be limited to the preferred embodiments so described and/or illustrated herein. The present invention is not limited to the preferred embodiments that have been described above. The present invention also includes every embodiment that includes equivalent elements, modifications, deletions, combinations, improvements and/or alternations that those skilled in the art to which the present invention pertains can recognize based on the disclosure herein. The limitative matters of the claims should be construed broadly based on terms used in the claims and hence should not be limited by the preferred embodiments described in this specification or the prosecution of this patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame that leans right when the vehicle turns right and leans left when the vehicle turns left;
   a right front wheel that rotates about a right axle extending in a direction of a right axle axis;
   a left front wheel provided leftward of the right front wheel and that rotates about a left axle extending in a direction of a left axle axis;
   a linkage that changes a relative position of the right front wheel and the left front wheel in an up-and-down direction of the body frame as the body frame leans;
   a right shock absorber that supports the right front wheel at a lower portion thereof and absorbs a relative displacement of the lower portion to an upper portion thereof along a right extension and contraction axis extending in the up-and-down direction of the body frame;
   a left shock absorber that supports the left front wheel at a lower portion thereof and absorbs a relative displacement of the lower portion to an upper portion thereof along a left extension and contraction axis extending in the up-and-down direction of the body frame;
   an engine fixed to an engine support of the body frame so as not to be displaced; and
   a body cover that covers at least a portion of the linkage; wherein
   the linkage includes:
      a right side member that supports the upper portion of the right shock absorber such that the upper portion is able to turn about a right steering axis;
      a left side member that supports the upper portion of the left shock absorber such that the upper portion is able to turn about a left steering axis;
      an upper cross member that supports an upper portion of the right side member at a right end portion of the upper cross member such that the upper portion is able to turn about a right upper axis extending in a front-and-rear direction of the body frame, to support an upper portion of the left side member at a left end portion of the upper cross member such that the upper portion is able to turn about a left upper axis located parallel to the right upper axis, and is supported on the body frame at a middle portion of the upper cross member so as to turn about a middle upper axis located parallel to the right upper axis and the left upper axis; and a lower cross member that supports a lower portion of the right side member at a right end portion of the lower cross member such that the lower portion is able to turn about a right lower axis located parallel to the right upper axis, support a lower portion of the left side member at a left end portion of the lower cross member such that the lower portion is able to turn about a left lower axis located parallel to the left upper axis, and is supported on the body frame at a middle portion of the lower cross member so as to turn about a middle lower axis located parallel to the middle upper axis; and the vehicle satisfies at least one of a condition (A) and a condition (B) below:

the condition (A): a right waterproof cover is located behind a rear end of the right side member and ahead of the engine support of the body frame when the vehicle standing in an upright state is seen from the right of the vehicle, and at least a portion of the right waterproof cover overlaps the right side member when the vehicle is seen from the front of the vehicle; and the condition (B): a left waterproof cover is located behind a rear end of the left side member and ahead of the engine support of the body frame when the vehicle standing in an upright state is seen from the left of the vehicle, and at least a portion of the left waterproof cover overlaps the left side member when the vehicle is seen from the front of the vehicle.

2. The vehicle according to claim 1, wherein
the engine includes a crankcase and a cylinder block mounted on an upper portion of the crankcase and extending upwards in the up-and-down direction of the body frame; and
the body frame supports the engine by the engine support being connected to the cylinder block.

3. The vehicle according to claim 1, wherein the body frame includes:
a link support that supports the upper cross member and the lower cross member;
a right frame extending from the link support rearwards in the front-and-rear direction of the body frame; and
a left frame extending from the link support rearwards in the front-and-rear direction of the body frame; wherein
the engine support is provided on the right frame and the left frame; and
the condition (A) further includes a condition that the right waterproof cover is located rightward of the right frame in a left-and-right direction of the body frame; and
the condition (B) further includes a condition that the left waterproof cover is located leftward of the left frame in the left-and-right direction of the body frame.

4. The vehicle according to claim 1, wherein
the condition (A) further includes a condition that the right waterproof cover is located in a plane parallel to a turning locus of the linkage on a front surface of the right waterproof cover in the front-and-rear direction of the vehicle body; and
the condition (B) further includes a condition that the left waterproof cover is located in a plane parallel to a turning locus of the linkage on a front surface of the left waterproof cover in the front-and-rear direction of the body frame.

5. The vehicle according to claim 1, further comprising:
a fuel tank disposed directly above the engine; wherein
the body cover includes an upper cover that covers the fuel tank; and
the condition (A) further includes a condition that the right waterproof cover is separate from the upper cover; and
the condition (B) further includes a condition that the left waterproof cover is separate from the upper cover.

* * * * *